United States Patent
Li

(10) Patent No.: US 11,848,801 B2
(45) Date of Patent: Dec. 19, 2023

(54) CHANNEL ESTIMATION METHOD AND APPARATUS, DEVICE, BASE STATION, AND STORAGE MEDIUM

(71) Applicant: Beijing Xiaomi Mobile Software Co., Ltd., Beijing (CN)

(72) Inventor: Yuanyuan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 463 days.

(21) Appl. No.: 17/269,414

(22) PCT Filed: Aug. 20, 2018

(86) PCT No.: PCT/CN2018/101381
§ 371 (c)(1),
(2) Date: Feb. 18, 2021

(87) PCT Pub. No.: WO2020/037468
PCT Pub. Date: Feb. 27, 2020

(65) Prior Publication Data
US 2021/0258193 A1    Aug. 19, 2021

(51) Int. Cl.
*H04L 12/50* (2006.01)
*H04L 25/02* (2006.01)
*H04W 72/0453* (2023.01)

(52) U.S. Cl.
CPC ..... *H04L 25/0228* (2013.01); *H04W 72/0453* (2013.01)

(58) Field of Classification Search
CPC .......... H04W 72/0453; H04W 25/0228; H04L 12/28
USPC ................. 370/329, 400, 401, 403
See application file for complete search history.

(56) References Cited

U.S. PATENT DOCUMENTS

| 2018/0227097 A1 | 8/2018 | Nystrom et al. |
| 2019/0222381 A1* | 7/2019 | Zhang ............... H04L 27/26025 |
| 2020/0304253 A1* | 9/2020 | Choi ..................... H04B 17/24 |

FOREIGN PATENT DOCUMENTS

| WO | WO 2018018510 A1 | 2/2018 |
| WO | WO 2018053801 A1 | 3/2018 |

OTHER PUBLICATIONS

Extended European Search Report in Application No. 18930809.1, dated Aug. 6, 2021.

* cited by examiner

*Primary Examiner* — Dang T Ton
(74) *Attorney, Agent, or Firm* — Finnegan, Henderson, Farabow, Garrett & Dunner, L.L.P.

(57) ABSTRACT

The present application relates to the technical field of wireless communication and provides a channel estimation method and apparatus, a device, a base station, and a storage medium. The method is applied in a first device, and includes: when a first message is transmitted between the first device and a second device, determining a resource block (RB) bearing the first message; determining at least one pilot symbol in the RB according to a carrier frequency and a subcarrier spacing of subcarriers included in the RB, and a relative speed between the first device and the second device; and estimating a current channel based on the at least one pilot symbol.

15 Claims, 11 Drawing Sheets

```
receiving an obtaining request sent by a first device,
wherein the obtaining request is configured to obtain a
    first communication protocol and a second                501
  communication protocol, the first communication
 protocol is stored with a correspondence relationship
 between carrier frequencies, subcarrier spacings, and
first pilot distributions, and the second communication
  protocol is stored with a correspondence relationship
     between carrier frequencies, subcarrier spacings,
   relative speed ranges, and second pilot distributions
```

```
   returning the first communication protocol and the     502
second communication protocol to the first device, such
  that the first device determines at least one pilot symbol
 in a resource block RB bearing a first message based on
      the first communication protocol and the second
      communication protocol, and estimates a current
 channel based on the at least one pilot symbol, wherein
 the first message is transmitted between the first device
                     and a second device
```

FIG. 5 time domain resources time domain resources

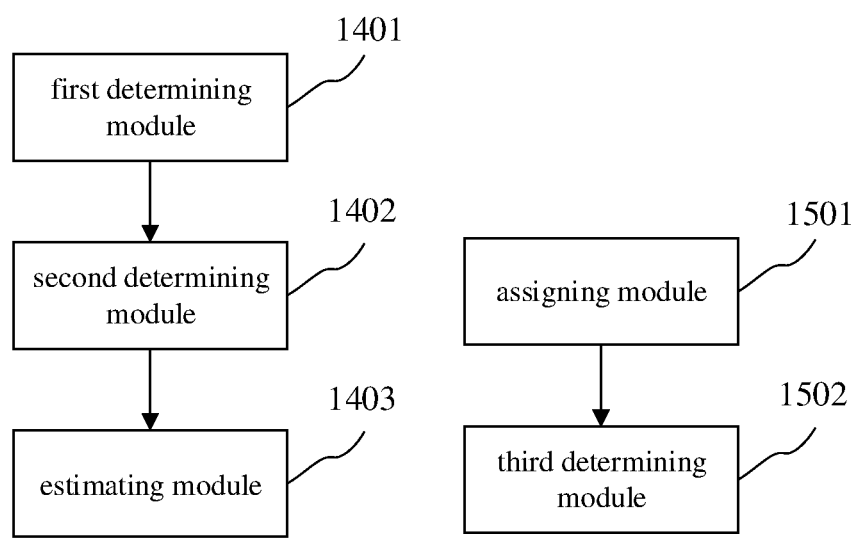

CHANNEL ESTIMATION METHOD AND APPARATUS, DEVICE, BASE STATION, AND STORAGE MEDIUM

CROSS REFERENCE TO RELATED APPLICATIONS

This application is a national phase application based on International Application No. PCT/CN2018/101381, filed Aug. 20, 2018, the content of which is incorporated herein by reference.

TECHNICAL FIELD

The disclosure relates to a field of communication technologies, and more particularly to a method and an apparatus for channel estimation, a device, a base station and a storage medium.

BACKGROUND

With the development of wireless communication technology, V2X (Vehicle-to-Everything, the wireless communication technology for vehicles) has evolved to be a C-V2X (Cellular-V2X) based on the cellular network communication technologies such as 4G (the $4^{th}$ Generation communication system)/5G (the 5th Generation communication system). The C-V2X includes two communication interfaces, in which one is a short-range direct communication interface between vehicles and target objects (for example, a vehicle, a person, or a road, etc.) and the other is a long-range and larger-range cellular communication Interface. The communication standard of the short-range direct communication interface is formulated on the basis of D2D (Device-to-Device, communication technology between devices) and a broadcast communication method is adopted, where a first terminal of the current vehicle enables the broadcast information to bear in the RB (Resource Block) and broadcasts to second terminals of a plurality of surrounding vehicles through the RB. There are pilot symbols in the RB. Therefore, the first terminal may use the pilot symbols for channel estimation.

At present, the fixed subcarrier spacing is 15 KHz, and the scheduling takes one subframe as a unit, in which subframe has a length of 1 ms and includes 14 OFDM (Orthogonal Frequency Division Multiplexing) symbols, and four OFDM symbols are occupied by pilot symbols (namely, the $3^{rd}$, $6^{th}$, $9^{th}$ and $12^{th}$ OFDM symbols). The first terminal uses four pilot symbols for channel estimation.

However, according to the pilot density of the pilot symbols for channel estimation, an accurate channel estimation value may be obtained only when the channel correlation time is in a level of ms. An important application scenario of V2R is of high speed, where the channel correlation time is in a level of µs. Since the channel correlation time is relatively low, the results of channel estimation will be extremely inaccurate if the above method is still used.

SUMMARY

According to a second aspect of embodiments of the disclosure, a method for channel estimation is provided. The method is applied to a base station, and includes: when a first message is transmitted between a first device and a second device, assigning a resource block RB bearing the first message to the first device; determining distribution information of at least one pilot symbol in the RB according to a carrier frequency and a subcarrier spacing of subcarriers included in the RB and a relative speed between the first device and the second device; and returning the distribution information of at least one pilot symbol to the first device, wherein the distribution information is configured for the first device to determine the at least one pilot symbol in the RB, and estimate a current channel based on the at least one pilot symbol.

According to a third aspect of embodiments of the disclosure, a method for channel estimation is provided. The method is applied to a base station, and includes: receiving an obtaining request sent by a first device, wherein the obtaining request is configured to obtain a first communication protocol and a second communication protocol, the first communication protocol is stored with a correspondence relationship between carrier frequencies, subcarrier spacings, and first pilot distributions, and the second communication protocol is stored with a correspondence relationship between carrier frequencies, subcarrier spacings, relative speed ranges, and second pilot distributions; and returning the first communication protocol and the second communication protocol to the first device, such that the first device determines at least one pilot symbol in a resource block RB bearing a first message based on the first communication protocol and the second communication protocol, and estimates a current channel based on the at least one pilot symbol, wherein the first message is transmitted between the first device and a second device.

According to a fourth aspect of embodiments of the disclosure, an apparatus for channel estimation is provided. The apparatus is applied to a first device, and includes: a first determining module, configured to, when a first message is transmitted between the first device and a second device, determine a resource block RB bearing the first message; a second determining module, configured to determine at least one pilot symbol in the RB according to a carrier frequency and a subcarrier spacing of subcarriers included in the RB and a relative speed between the first device and the second device; and an estimating module, configured to estimate a current channel based on the at least one pilot symbol.

According to a fifth aspect of embodiments of the disclosure, an apparatus for channel estimation is provided. The apparatus is applied to a base station, and includes: an assigning module, configured to, when a first message is transmitted between a first device and a second device, assign a resource block RB bearing the first message to the first device; a third determining module, configured to determine distribution information of at least one pilot symbol in the RB according to a carrier frequency and a subcarrier spacing of subcarriers included in the RB and a relative speed between the first device and the second device; and a second sending module, configured to return the distribution information of at least one pilot symbol to the first device, wherein the distribution information is configured for the first device to determine the at least one pilot symbol in the RB, and estimate a current channel based on the at least one pilot symbol.

According to a sixth aspect of embodiments of the disclosure, an apparatus for channel estimation is provided. The apparatus is applied to a base station, and includes: a second receiving module, configured to receive an obtaining request sent by a first device, wherein the obtaining request is configured to obtain a first communication protocol and a second communication protocol, the first communication protocol is stored with a correspondence relationship between carrier frequencies, subcarrier spacings, and first pilot distributions, and the second communication protocol is stored with a correspondence relationship between carrier frequencies, subcarrier spacings, relative speed ranges, and second pilot distributions; and a third sending module, configured to return the first communication protocol and the second communication protocol to the first device, such that the first device determines at least one pilot symbol in a resource block RB bearing a first message based on the first communication protocol and the second communication protocol, and estimates a current channel based on the at least one pilot symbol, wherein the first message is transmitted between the first device and a second device.

According to a seventh aspect of embodiments of the disclosure, a device is provided. The device includes: a processor; and a memory, configured to store instructions executable by the processor. The processor is configured to: when a first message is transmitted between the first device and a second device, determine a resource block RB bearing the first message; determine at least one pilot symbol in the RB according to a carrier frequency and a subcarrier spacing of subcarriers included in the RB and a relative speed between the first device and the second device; and estimate a current channel based on the at least one pilot symbol.

According to an eighth aspect of embodiments of the disclosure, a base station is provided. The base station includes: a processor; and a memory, configured to store instructions executable by the processor. The processor is configured to: when a first message is transmitted between a first device and a second device, assign a resource block RB bearing the first message to the first device; determine distribution information of at least one pilot symbol in the RB according to a carrier frequency and a subcarrier spacing of subcarriers included in the RB and a relative speed between the first device and the second device; and return the distribution information of at least one pilot symbol to the first device, wherein the distribution information is configured for the first device to determine the at least one pilot symbol in the RB, and estimate a current channel based on the at least one pilot symbol.

According to a ninth aspect of embodiments of the disclosure, a base station is provided. The base station includes: a processor; and a memory, configured to store instructions executable by the processor. The processor is configured to: receive an obtaining request sent by a first device, wherein the obtaining request is configured to obtain a first communication protocol and a second communication protocol, the first communication protocol is stored with a correspondence relationship between carrier frequencies, subcarrier spacings, and first pilot distributions, and the second communication protocol is stored with a correspondence relationship between carrier frequencies, subcarrier spacings, relative speed ranges, and second pilot distributions; and return the first communication protocol and the second communication protocol to the first device, such that the first device determines at least one pilot symbol in a resource block RB bearing a first message based on the first communication protocol and the second communication protocol, and estimates a current channel based on the at least one pilot symbol, wherein the first message is transmitted between the first device and a second device.

According to a tenth aspect of embodiments of the disclosure, a computer readable storage medium is provided. The computer readable storage medium is stored thereon with instructions that, when executed by a processor, the method for channel estimation according to any embodiment of the first aspect is implemented.

According to an eleventh aspect of embodiments of the disclosure, a computer readable storage medium is provided. The computer readable storage medium is stored thereon with instructions that, when executed by a processor, the method for channel estimation according to any embodiment of the second aspect is implemented.

According to a twelfth aspect of embodiments of the disclosure, a computer readable storage medium is provided. The computer readable storage medium is stored thereon with instructions that, when executed by a processor, the method for channel estimation according to any embodiment of the third aspect is implemented.

In embodiments of the disclosure, at least one pilot symbol is determined in the RB according to the carrier frequency, the subcarrier spacing and the relative speed. Since the carrier frequency and the relative speed are considered, the set pilot symbol matches the carrier frequency and the relative speed, thereby improving the accuracy of the determined pilot symbol, and further improving the accuracy of channel estimation.

It should be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate exemplary embodiments consistent with the disclosure, and serve to explain the principle of the disclosure together with the specification.

FIG. 5 is a flow chart illustrating a method for channel estimation according to an exemplary embodiment.

FIG. 14 is a block diagram illustrating an apparatus for channel estimation according to an exemplary embodiment.

FIG. 15 is a block diagram illustrating an apparatus for channel estimation according to an exemplary embodiment.

FIG. 16 is a block diagram illustrating an apparatus for channel estimation according to an exemplary embodiment.

DETAILED DESCRIPTION

In order to make the objectives, technical solutions, and advantages of the = disclosure clearer, the embodiments of the disclosure will be further described below in detail in conjunction with the accompanying drawings.

The exemplary embodiments will be described in detail here, and examples thereof are illustrated in the accompanying drawings. When the following descriptions refer to the accompanying drawings, unless otherwise indicated, the same numbers in different drawings represent the same or similar elements. The implementations described in the following exemplary embodiments do not represent all implementations consistent with the disclosure. Rather, they are only examples of apparatuses and methods consistent with some aspects of the disclosure as detailed in the appended claims.

Figure 1:
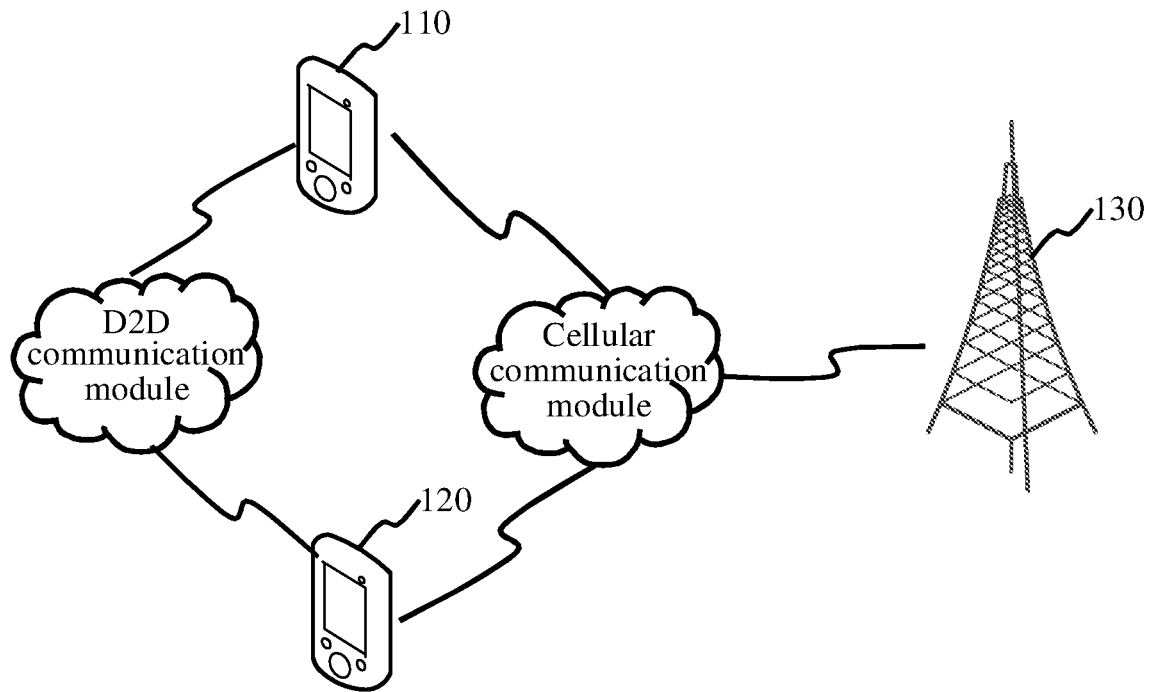
FIG. 1 is a schematic diagram illustrating an architecture of a system for channel estimation according to an exemplary embodiment.

FIG. 1 is a schematic diagram illustrating an architecture of a system involved in a method for channel estimation according to some exemplary embodiments of the disclosure. The architecture of the system includes a first device 110 and a second device 120. The first device 110 and the second device 120 may be connected through a short-range communication module, or may be connected through a cellular communication module. The short-range communication module may be a D2D communication module, and the cellular communication module may be a 4G or 5G communication module. The first device 110 may be a first terminal that may be a mobile phone terminal or a vehicle-mounted terminal. The vehicle-mounted terminal may be a terminal in any one of vehicles. For example, the vehicle-mounted terminal may be a terminal in a car, or a terminal in a train, or a terminal in a ship, etc. The second device 120 may be a second terminal or a base station. Similarly, the second terminal may be a mobile phone terminal or a vehicle-mounted terminal.

It should be noted that, when the second device 120 is the second terminal, the architecture of the system also includes a base station 130, and the first device 110 is connected with the base station 130 through a cellular communication module. In FIG. 1, the second device 120 is the second terminal as an example for description.

It should be also noted that, the architecture of the system may be a V2X system or a C-V2X system.

Figure 2:
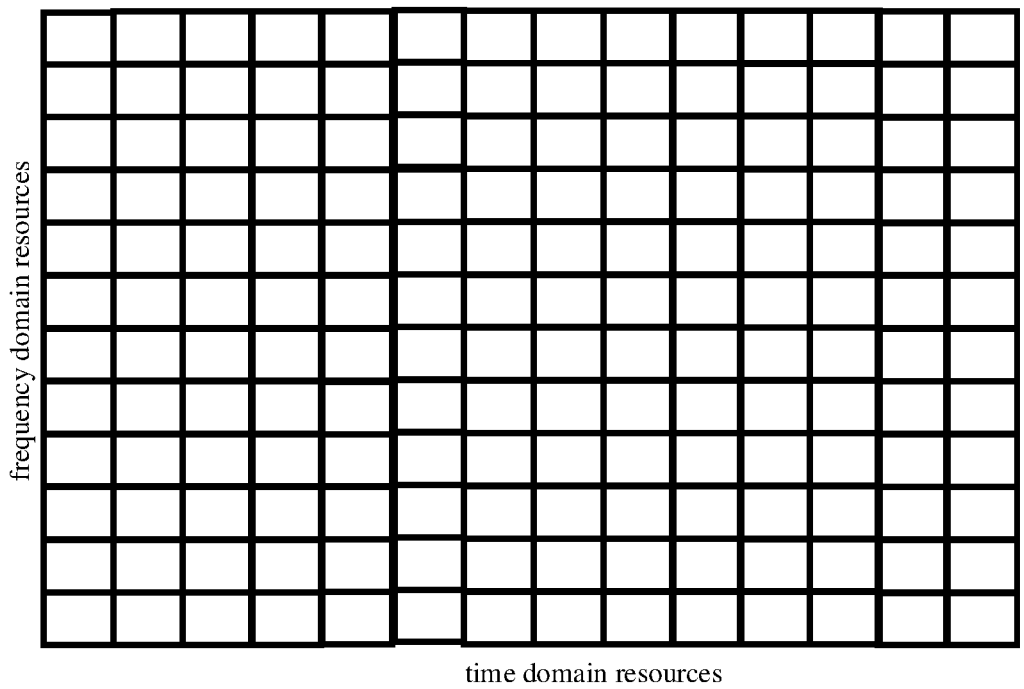
FIG. 2 is a schematic diagram illustrating an RB according to an exemplary embodiment.

When a first message is transmitted between the first device 110 and the second device 120, the first message needs to be carried in an RB. The RB has 12 subcarriers in the frequency domain, and each subcarrier corresponds to 14 OFDM symbols in the time domain. One OFDM symbol of one subcarrier in the time domain is equivalent to one RE, that is, one RB includes 168 REs (Resource Elements). The RE is represented as a subcarrier in the frequency domain and as an OFDM symbol in the time domain. As illustrated in FIG. 2, FIG. 2 is a structural schematic diagram of an RB.

Due to the diversity of mobile propagation environments between the first device 110 and the second device 120, that is, the first message transmitted between the first device 110 and the second device 120 is encountered to different buildings, trees and rugged topography during the propagation, the rms (root mean square error) delay spread in different mobile propagation environments is different, which leads to different channel correlation bandwidths. Therefore, the multipath distribution in the mobile propagation environments, carrier frequency and subcarrier spacing should be considered for the structural design of the pilot in the frequency domain of the RB. Therefore, when the position of the pilot in the frequency domain is determined, correlation bandwidths should be considered. The calculation equations for the correlation bandwidths are $1/(2*pi*rms)$ if the envelope correlation coefficient is 0.5 and $1/(50*rms\ delay\ spread)$ if the correlation coefficient is 0.9, in which the rms delay spread is related to the carrier frequency and channel propagation environments and is generally obtained through measurement statistics. Since the first device 110 and the second device 120 have a feature of high-speed motion, the channel correlation time needs to be considered when designing in the time domain of the RB. When determining the position of the pilot in the time domain, the correlation time needs to be considered. The calculation equation of the correlation time is $0.423/fd$, in which fd is the maximum Doppler frequency offset, and the spacing between pilots in the time domain must be less than or equal to the correlation time.

Figure 3:
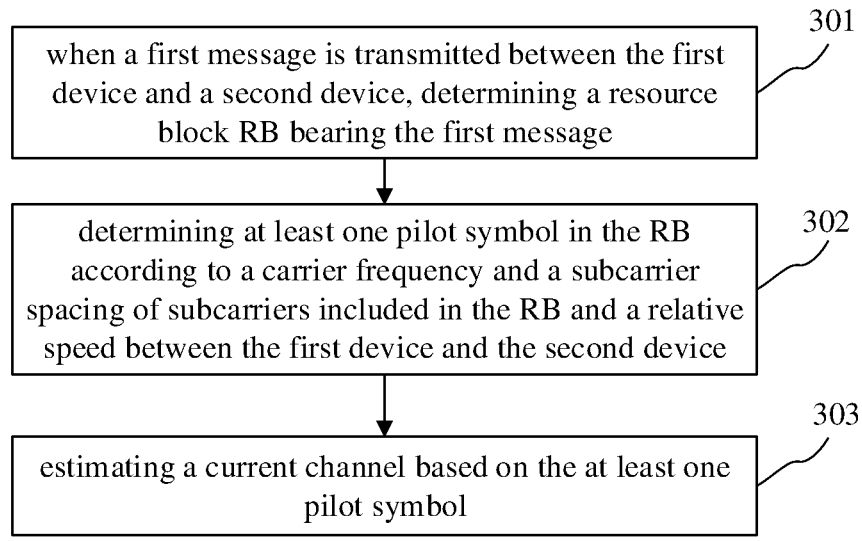
FIG. 3 is a flow chart illustrating a method for channel estimation according to an exemplary embodiment.

FIG. 3 is a flow chart illustrating a method for channel estimation according to an exemplary embodiment. The method is applied to the first device. As illustrated in FIG. 3, the method for channel estimation may include the following steps.

In step 301, when a first message is transmitted between the first device and a second device, a resource block RB bearing the first message is determined.

In step 302, at least one pilot symbol is determined in the RB according to a carrier frequency and a subcarrier spacing of subcarriers included in the RB and a relative speed between the first device and the second device.

In step 303, the current channel is estimated based on the at least one pilot symbol.

In a possible implementation, determining at least one pilot symbol in the RB according to the carrier frequency and the subcarrier spacing of subcarriers included in the RB and the relative speed between the first device and the second device includes: determining a first pilot distribution of pilot symbols in the RB in a frequency domain according to the carrier frequency and the subcarrier spacing, and determining a second pilot distribution of pilot symbols in the RB in a time domain according to the carrier frequency, the subcarrier spacing and the relative speed; and setting at least one pilot symbol in the RB according to the first pilot distribution and the second pilot distribution.

In another possible implementation, determining the first pilot distribution of pilot symbols in the RB in the frequency domain according to the carrier frequency and the subcarrier spacing, and determining the second pilot distribution of pilot symbols in the RB in the time domain according to the carrier frequency, the subcarrier spacing and the relative speed includes: obtaining the first pilot distribution of pilot symbols in the RB in the frequency domain from a stored first communication protocol according to the carrier frequency and the subcarrier spacing; and obtaining the second pilot distribution of pilot symbols in the RB in the time domain from a stored second communication protocol according to the carrier frequency, the subcarrier spacing and the relative speed. The first communication protocol is stored with a correspondence relationship between carrier frequencies, subcarrier spacings, and first pilot distributions. The second communication protocol is stored with a correspondence relationship between carrier frequencies, subcarrier spacings, relative speed ranges, and second pilot distributions.

In another possible implementation, determining the first pilot distribution of pilot symbols in the RB in the frequency domain according to the carrier frequency and the subcarrier spacing, and determining the second pilot distribution of pilot symbols in the RB in the time domain according to the carrier frequency, the subcarrier spacing and the relative speed includes: sending a query request to a base station; and receiving the first pilot distribution and the second pilot distribution returned by the base station. The query request carries the carrier frequency, the subcarrier spacing and the relative speed, and the query request is configured for the base station to determine the first pilot distribution of pilot symbols in the RB in the frequency domain according to the carrier frequency and the subcarrier spacing and determine the second pilot distribution of pilot symbols in the RB in the time domain according to the carrier frequency, the subcarrier spacing and the relative speed.

In another possible implementation, estimating the current channel based on the at least one pilot symbol includes: determining a number of symbols occupied by the current channel in time domain; determining a plurality of target resource elements RE in the RB according to the number of symbols and a number of subcarriers included in the RB; and estimating the current channel based on at least one pilot symbol in the plurality of target Res In another possible implementation, before obtaining the first pilot distribution of pilot symbols in the RB in the frequency domain from a stored first communication protocol according to the carrier frequency and the subcarrier spacing, the method further includes: sending an obtaining request to a base station; and receiving the first communication protocol and the second communication protocol returned by the base station. The obtaining request is configured to obtain the first communication protocol and the second communication protocol.

In another possible implementation, determining at least one pilot symbol in the RB according to the carrier frequency and the subcarrier spacing of subcarriers included in the RB and the relative speed between the first device and the second device includes: sending a configuration request to a base station; receiving an identifier of the at least one pilot symbol returned by the base station; and determining the at least one pilot symbol in the RB based on the identifier of the at least one pilot symbol. The configuration request carries the carrier frequency, the subcarrier spacing and the relative speed, and the configuration request is configured for the base station to configure at least one pilot symbol in the RB based on the carrier frequency, the subcarrier spacing and the relative speed.

In the embodiment of the disclosure, the first device determines at least one pilot symbol in the RB according to the carrier frequency, the subcarrier spacing, and the relative speed. Since the carrier frequency and the relative speed are considered, the set pilot symbol matches the carrier frequency and the relative speed, thereby improving the accuracy of the determined pilot symbol, and further improving the accuracy of channel estimation.

Figure 4:
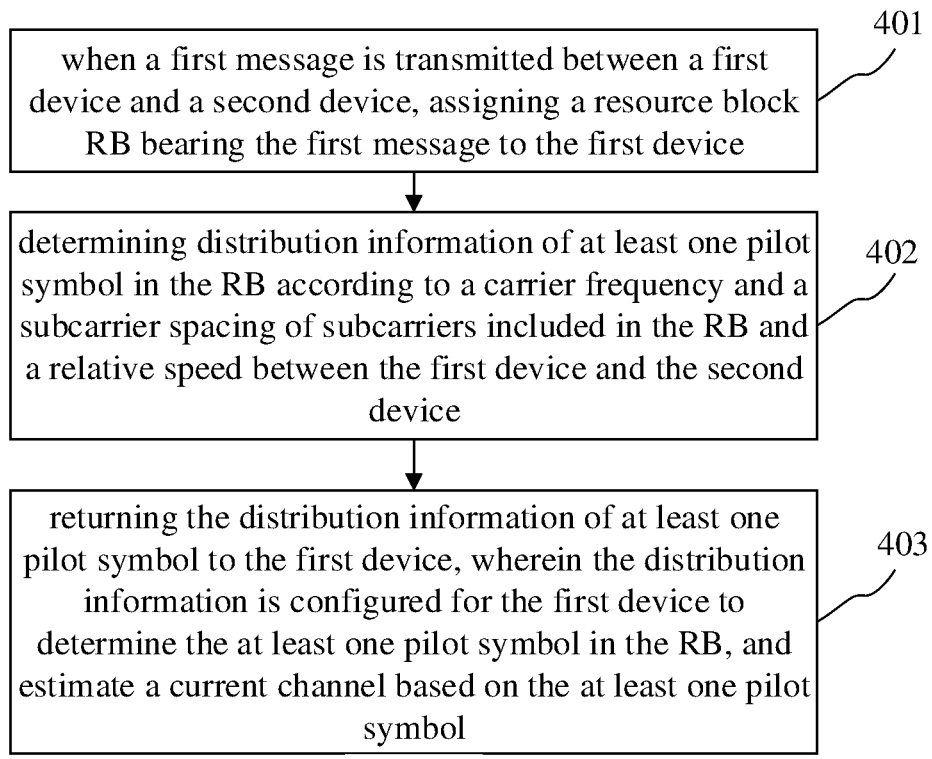
FIG. 4 is a flow chart illustrating a method for channel estimation according to an exemplary embodiment.

FIG. 4 is a flow chart illustrating a method for channel estimation according to an exemplary embodiment. The method is applied to a base station. As illustrated in FIG. 4, the method for channel estimation may include the following steps.

In step 401, when a first message is transmitted between a first device and a second device, a resource block RB bearing the first message is assigned to the first device.

In step 402, distribution information of at least one pilot symbol is determined in the RB according to a carrier frequency and a subcarrier spacing of subcarriers included in the RB and a relative speed between the first device and the second device.

In step 402, the distribution information of at least one pilot symbol is returned to the first device. The distribution information is configured for the first device to determine the at least one pilot symbol in the RB, and estimate a current channel based on the at least one pilot symbol.

In a possible implementation, the distribution information includes a first pilot distribution and a second pilot distribution. Determining the distribution information of at least one pilot symbol in the RB according to the carrier frequency and the subcarrier spacing of subcarriers included in the RB and the relative speed between the first device and the second device includes: receiving a query request sent by the first device; determining the first pilot distribution of pilot symbols in the RB in the frequency domain according to the carrier frequency and the subcarrier spacing; and determining the second pilot distribution of pilot symbols in the RB in the time domain according to the carrier frequency, the subcarrier spacing, and the relative speed. The query request carries the carrier frequency, the subcarrier spacing and the relative speed.

In another possible implementation, the distribution information includes an identifier of pilot symbol. Determining the distribution information of at least one pilot symbol in the RB according to the carrier frequency and the subcarrier spacing of subcarriers included in the RB and the relative speed between the first device and the second device includes: receiving a configuration request sent by the first device; determining a first pilot distribution of pilot symbols in the RB in the frequency domain according to the carrier frequency and the subcarrier spacing; determining a second pilot distribution of pilot symbols in the RB in the time domain according to the carrier frequency, the subcarrier spacing and the relative speed; setting at least one pilot symbol in the RB according to the first pilot distribution and the second pilot distribution; and determining the identifier of the at least one pilot symbol. The configuration request carries the carrier frequency, the subcarrier spacing and the relative speed.

In the embodiment of the disclosure, at least one pilot symbol is determined in the RB according to the carrier frequency, the subcarrier spacing, and the relative speed. Since the carrier frequency and the relative speed are considered, the set pilot symbol matches the carrier frequency and the relative speed, thereby improving the accuracy of the determined pilot symbol, and further improving the accuracy of channel estimation.

FIG. 5 is a flow chart illustrating a method for channel estimation according to an exemplary embodiment. The method is applied to a base station. As illustrated in FIG. 5, the method for channel estimation may include the following steps.

In step 501, an obtaining request sent by a first device is received. The obtaining request is configured to obtain the first communication protocol and the second communication protocol. The first communication protocol is stored with a correspondence relationship between carrier frequencies, subcarrier spacings, and first pilot distributions, and the second communication protocol is stored with a correspondence relationship between carrier frequencies, subcarrier spacings, relative speed ranges, and second pilot distributions.

In step 502, the first communication protocol and the second communication protocol are returned to the first device, such that the first device determines at least one pilot symbol in a resource block RB bearing a first message based on the first communication protocol and the second communication protocol, and estimates a current channel based on the at least one pilot symbol. The first message is transmitted between the first device and a second device.

In a possible implementation, the method further includes: determining a plurality of sample carrier frequencies, a plurality of sample subcarrier spacings, and a plurality of sample relative speeds; determining a plurality of sample first pilot distributions according to the plurality of sample carrier frequencies and the plurality of sample subcarrier spacings, and determining a plurality of sample second pilot distributions according to the plurality of sample carrier frequencies and the plurality of sample relative speeds; generating the first communication protocol based on the plurality of sample carrier frequencies, the plurality of sample subcarrier spacings and the plurality of sample first pilot distributions, and generating the second communication protocol based on the plurality of sample carrier frequencies, the plurality of sample subcarrier spacings, a plurality of relative speed ranges corresponding to the plurality of sample relative speeds, and the plurality of sample second pilot distributions.

It should be noted that, in another embodiment of the disclosure, the base station may not be used by the terminal to obtain the first communication protocol and the second communication protocol. The terminal may generate the first communication protocol and the second communication protocol in a way of generating the first communication protocol and the second communication protocol through the base station. The subsequent steps are completed according to the first communication protocol and the second communication protocol.

In the embodiment of the disclosure, at least one pilot symbol is determined in the RB according to the carrier frequency, the subcarrier spacing, and the relative speed. Since the carrier frequency and the relative speed are considered, the set pilot symbol matches the carrier frequency and the relative speed, thereby improving the accuracy of the determined pilot symbol, and further improving the accuracy of channel estimation.

Figure 6:
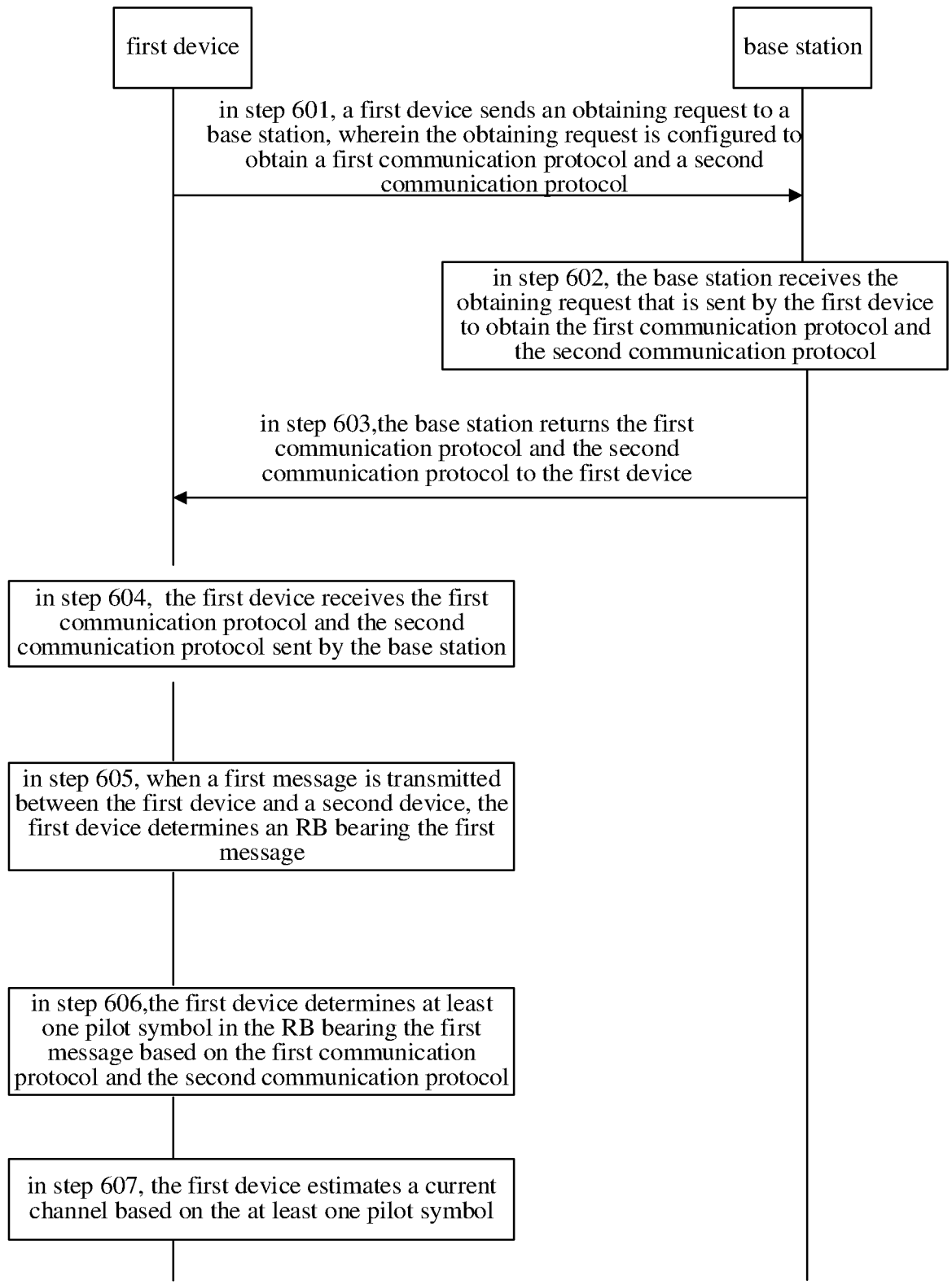
FIG. 6 is a flow chart illustrating a method for channel estimation according to an exemplary embodiment.

FIG. 6 is a flow chart illustrating a method for channel estimation according to an exemplary embodiment. In the embodiment of the disclosure, it is taken as an example that the first device obtains the first communication protocol and the second communication protocol from the base station, at least one pilot symbol is configured in the RB based on the first communication protocol and the second communication protocol, and the channel estimation is performed based on at least one pilot symbol. As illustrated in FIG. 6, the method for channel estimation may include the following steps.

In step 601, the first device sends an obtaining request to the base station. The obtaining request is configured to obtain a first communication protocol and a second communication protocol. The first communication protocol is stored with a correspondence relationship between carrier frequencies, subcarrier spacings, and first pilot distributions. The second communication protocol is stored with a correspondence relationship between carrier frequencies, subcarrier spacings, relative speed ranges, and second pilot distributions.

The first message may be transmitted between the first device and the second device. When transmitting the first message, the first device needs to bear the first message in the RB, and may set a pilot symbol in the RB. Therefore, the first device may estimate a current channel through the pilot symbol. Before transmitting the first message between the first device and the second device, the first device sends an obtaining request to the base station, so as to obtain the first communication protocol and the second communication protocol from the base station, and determine the pilot symbol in the RB based on the first communication protocol and the second communication protocol. The obtaining request carries at least a device identifier of the first device.

In step 602, the base station receives the obtaining request that is sent by the first device to obtain the first communication protocol and the second communication protocol.

In a possible implementation, the base station generates the first communication protocol and the second communication protocol when receiving the obtaining request sent by the first device. In another possible implementation, the base station generates in advance the first communication protocol and the second communication protocol, and the generated first communication protocol and second communication protocol are obtained when the base station receives the obtaining request sent by the first device. The step of generating the first communication protocol and the second communication protocol by the base station may be implemented through the following steps 6011-6013.

In step 6021, the base station determines a plurality of sample carrier frequencies, a plurality of sample subcarrier spacings, and a plurality of sample relative speeds.

This step may be implemented through the following steps (1) to (3).

In step (1): the base station determines a carrier frequency range and performs sampling within the carrier frequency range to obtain a plurality of sample carrier frequencies.

In this step, the base station may perform random sampling within the carrier frequency range to obtain a plurality of sample carrier frequencies, or may perform uniform sampling within the carrier frequency range to obtain a plurality of sample carrier frequencies. The base station may also determine a plurality of subcarrier frequency ranges included in the carrier frequency range, select one carrier frequency from each subcarrier frequency range to obtain a plurality of sample carrier frequencies.

It should be noted that, a number of sample carrier frequencies may be set and changed as required. In the embodiment of the disclosure, the number of sample carrier frequencies is not specifically limited, for example, the number of sample carrier frequencies may be 3 or 5, etc. In the embodiment of the disclosure, the number of sample carrier frequencies is 3 as an example for description. For example, the 3 sample carrier frequencies determined by the base station are 6 GHz, 30 GHz, and 63 GHz, respectively.

In step (2): the base station determines a plurality of sample subcarrier spacings according to the plurality of sample carrier frequencies, in which one sample carrier frequency corresponds to at least one sample subcarrier spacing.

The base station stores a correspondence relationship between carrier frequencies and subcarrier spacings. Correspondingly, for each sample carrier frequency, the step of determining by the base station at least one sample subcarrier spacing according to the sample carrier frequency may be that, the base station determines at least one sample subcarrier spacing corresponding to the sample carrier frequency from the correspondence relationship between carrier frequencies and subcarrier spacings.

For example, when the sample carrier frequency is 6 GHz, the sample carrier frequency corresponds to 2 subcarrier spacings which are 30 KHz and 60 KHz, respectively; when the sample carrier frequency is 30 GHz, the sample carrier frequency corresponds to 3 subcarrier spacings which are 60

KHz, 120 KHz, and 240 KHz, respectively; when the sample carrier frequency is 63 GHz, the sample carrier frequency corresponds to 2 sample subcarrier spacings which are 120 KHz and 240 KHz respectively.

In step (3): the base station determines a plurality of sample relative speeds.

The plurality of sample relative speeds may be randomly generated by the base station or configured by the user. In addition, a number of sample relative speeds may be set and changed as required. In the embodiment of the disclosure, the number of sample relative speeds is not specifically limited, for example, there are 4 sample relative speeds, which are 3 km/h, 140 km/h, 240 km/h and 500 km/h, respectively.

In step 6022, the base station determines a plurality of sample first pilot distributions based on the plurality of sample carrier frequencies and the plurality of sample subcarrier spacings, and determines a plurality of sample second pilot distributions according to the plurality of sample carrier frequencies, the plurality of sample subcarrier spacings and the plurality of sample relative speeds.

The first pilot distribution includes a first distribution frequency of pilot symbols in the frequency domain, and the first distribution frequency is that one pilot symbol is included in a first number of REs. The second pilot distribution includes a second distribution frequency of pilot symbols in the time domain, and the second distribution frequency is that a third number of pilot symbols are included in a second number of REs. Correspondingly, this step may be implemented through the following steps (1) and (2).

In step (1): the base station determines the plurality of sample first pilot distributions according to the plurality of sample carrier frequencies and the plurality of sample subcarrier spacings.

The base station stores a correspondence relationship between carrier frequencies, subcarrier spacings and a number of pilot symbols. Correspondingly, for each sample carrier frequency and each sample subcarrier spacing, the step of determining by the base station the sample first pilot distribution according to the sample carrier frequency and the sample subcarrier spacing may be that, the base station obtains the first number corresponding to the sample carrier frequency and the sample subcarrier spacing from the correspondence relationship between carrier frequencies, subcarrier spacings and the number of pilot symbols, generates the first distribution frequency based on the first number and forms a sample first pilot distribution from the first distribution frequency.

For example, in the frequency domain, when the sample carrier frequency is 6 GHz and the sample subcarrier spacing is 30 KHz, at least one pilot symbol is required in every 27 REs. Correspondingly, the sample first pilot distribution corresponding to the sample carrier frequency of 6 GHz and the sample subcarrier spacing of 30 KHz is at least one pilot symbol in every 27 REs. When the sample carrier frequency is 6 GHz and the sample subcarrier spacing is 60 KHz, one pilot symbol is required in every 13 REs. Correspondingly, the sample first pilot frequency distribution corresponding to the sample carrier frequency of 6 GHz and the sample subcarrier spacing of 60 KHz is one pilot symbol in every 13 REs.

For another example, when the sample carrier frequency is 30 GHz and the sample subcarrier spacing is 60 KHz, at least one pilot symbol is required in every 20 REs. Correspondingly, the sample first pilot distribution corresponding to the sample carrier frequency of 30 GHz and the sample subcarrier spacing of 60 KHz is at least one pilot symbol in every 20 REs. When the sample carrier frequency is 30 GHz and the sample subcarrier spacing is 240 KHz, at least one pilot symbol is required in every 5 REs. Correspondingly, the sample first pilot distribution corresponding to the sample carrier frequency of 30 GHz and the sample subcarrier spacing of 240 KHz is at least one pilot symbol in every 5 REs.

For another example, when the sample carrier frequency is 63 GHz and the sample subcarrier spacing is 120 KHz, at least one pilot symbol is required in every 11 REs. Correspondingly, the sample first pilot distribution corresponding to the sample carrier frequency of 63 GHz and the sample subcarrier spacing of 60120 KHz is at least one pilot symbol in every 11 REs. When the sample carrier frequency is 63 GHz and the sample subcarrier spacing is 240 KHz, at least one pilot symbol is required in every 5 REs. Correspondingly, the sample first pilot distribution corresponding to the sample carrier frequency of 63 GHz and the sample subcarrier spacing of 240 KHz is at least one pilot symbol in every 5 REs.

It should be noted that the scheduling of frequency domain resources may take one RB or a plurality of RBs as a unit, in which one RB includes 12 subcarriers, one subcarrier includes 14 OFDM symbols in the time domain, and one OFDM symbol corresponds to 12 REs in the frequency domain. Correspondingly, in case that the scheduling of frequency domain resources takes one RB as a unit, the scheduling of frequency domain resources takes 12 REs as a unit, the above frequency domain is designed as follows.

When the sample carrier frequency is 6 GHz and the sample subcarrier spacing is 30 KHz, at least one pilot symbol is required in every 12 REs. Correspondingly, the sample first pilot distribution corresponding to the sample carrier frequency of 6 GHz and the sample subcarrier spacing of 30 KHz is at least one pilot symbol in every 12 REs. When the sample carrier frequency is 6 GHz and the sample subcarrier spacing is 60 KHz, one pilot symbol is required in every 12 REs. Correspondingly, the sample first pilot distribution corresponding to the sample carrier frequency of 6 GHz and the sample subcarrier spacing of 60 KHz is one pilot symbol in every 12 REs.

When the sample carrier frequency is 30 GHz and the sample subcarrier spacing is 60 KHz, at least one pilot symbol is required in every 12 REs. Correspondingly, the sample first pilot distribution corresponding to the sample carrier frequency of 30 GHz and the sample subcarrier spacing of 60 KHz is at least one pilot symbol in every 12 REs. When the sample carrier frequency is 30 GHz and the sample subcarrier spacing is 120 KHz, at least one pilot symbol is required in every 6 REs. Correspondingly, the sample first pilot distribution corresponding to the sample carrier frequency of 30 GHz and the sample subcarrier spacing of 120 KHz is at least one pilot symbol in every 6 REs. When the sample carrier frequency is 30 GHz and the sample subcarrier spacing is 240 KHz, at least one pilot symbol is required in every 4 REs. Correspondingly, the sample first pilot distribution corresponding to the sample carrier frequency of 30 GHz and the sample subcarrier spacing of 240 KHz is at least one pilot symbol in every 4 REs.

When the sample carrier frequency is 63 GHz and the sample subcarrier spacing is 120 KHz, at least one pilot symbol is required in every 6 REs. Correspondingly, the sample first pilot distribution corresponding to the sample carrier frequency of 63 GHz and the sample subcarrier spacing of 120 KHz is at least one pilot symbol in every 6

REs. When the sample carrier frequency is 63 GHz and the sample subcarrier spacing is 240 KHz, at least one pilot symbol is required in every 4 REs. Correspondingly, the sample first pilot distribution corresponding to the sample carrier frequency of 63 GHz and the sample subcarrier spacing of 240 KHz is at least one pilot symbol in every 4 REs.

Similarly, in case that the scheduling of frequency domain resources takes 2 RBs as a unit, the scheduling of frequency domain resources takes 24 REs as a unit, the above frequency domain is designed as follows.

When the sample carrier frequency is 6 GHz and the sample subcarrier spacing is 30 KHz, at least one pilot symbol is required in every 24 REs. Correspondingly, the sample first pilot distribution corresponding to the sample carrier frequency of 6 GHz and the sample subcarrier spacing of 30 KHz is at least one pilot symbol in every 24 REs. When the sample carrier frequency is 6 GHz and the sample subcarrier spacing is 60 KHz, one pilot symbol is required in every 12 REs. Correspondingly, the sample first pilot distribution corresponding to the sample carrier frequency of 6 GHz and the sample subcarrier spacing of 60 KHz is one pilot symbol in every 12 REs.

When the sample carrier frequency is 30 GHz and the sample subcarrier spacing is 60 KHz, at least one pilot symbol is required in every 12 REs. Correspondingly, the sample first pilot distribution corresponding to the sample carrier frequency of 30 GHz and the sample subcarrier spacing of 60 KHz is at least one pilot symbol in every 12 REs. When the sample carrier frequency is 30 GHz and the sample subcarrier spacing is 120 KHz, at least one pilot symbol is required in every 6 REs. Correspondingly, the sample first pilot frequency distribution corresponding to the sample carrier frequency of 30 GHz and the sample subcarrier spacing of 120 KHz is at least one pilot symbol in every 6 REs. When the sample carrier frequency is 30 GHz and the sample subcarrier spacing is 240 KHz, at least one pilot symbol is required in every 4 REs. Correspondingly, the sample first pilot frequency distribution corresponding to the sample carrier frequency of 30 GHz and the sample subcarrier spacing of 240 KHz is at least one pilot symbol in every 4 REs.

When the sample carrier frequency is 63 GHz and the sample subcarrier spacing is 120 KHz, at least one pilot symbol is required in every 6 REs. Correspondingly, the sample first pilot frequency distribution corresponding to the sample carrier frequency of 63 GHz and the sample subcarrier spacing of 120 KHz is at least one pilot symbol in every 6 REs. When the sample carrier frequency is 63 GHz and the sample subcarrier spacing is 240 KHz, at least one pilot symbol is required in every 4 REs. Correspondingly, the sample first pilot frequency distribution corresponding to the sample carrier frequency of 63 GHz and the sample subcarrier spacing of 240 KHz is at least one pilot symbol in every 4 REs.

It should be also noted that the scheduling of frequency domain resources may also take more than 2 RBs as a unit. For example, the scheduling of frequency domain resources may take more than 3 RBs or 4 RBs as a unit, which will not be illustrated one by one in the embodiments of the disclosure.

In step (2): the base station determines a plurality of sample second pilot distributions according to the plurality of sample carrier frequencies, the plurality of sample subcarrier spacings, and the plurality of sample relative speeds.

The base station also stores a correspondence relationship between carrier frequencies, subcarrier spacings, relative speeds, and a number of pilot symbols. For each sample carrier frequency, each sample subcarrier spacing and each sample relative speed, the step of determining by the base station the second pilot distribution according to the sample carrier frequency, the sample subcarrier spacing and the sample relative speed may be that, the base station obtains the second distribution frequency corresponding to the sample carrier frequency, the sample subcarrier spacing, and the sample relative speed from the correspondence relationship between carrier frequencies, subcarrier spacings, relative speeds, and the number of pilot symbols according to the sample carrier frequency, the sample subcarrier spacing and the sample relative speed, and forms a sample second pilot distribution from the second distribution frequency.

The base station generates in advance a correspondence relationship between carrier frequencies, subcarrier spacings, relative speeds and a number of pilot symbols. For any carrier frequency, any subcarrier spacing and any relative speed, the step of generating by the base station the correspondence relationship between carrier frequencies, subcarrier spacings, relative speeds and the number of pilot symbols may be that, the base station determines a maximum Doppler frequency offset according to the relative speed, determines correlation time according to the maximum Doppler frequency offset, determines the number of pilot symbols according to the correlation time, the carrier frequency and the subcarrier spacing, associates the correspondence relationship between carrier frequencies, subcarrier spacings, relative speeds and the number of pilot symbols. The number of pilots should meet a condition that the pilot spacing of pilots in the time domain is not greater than the correlation time.

For example, in the time domain, when the sample carrier frequency is 6 GHz and the sample relative speed is 3 km/h, at least one pilot symbol is required every 25 ms. Correspondingly, the correlation time is 25 ms. When the sample carrier frequency is 6 GHz and the sample relative speed is 140 km/h, at least one pilot symbol is required every 0.5 ms. Correspondingly, the correlation time is 0.5 ms. When the sample carrier frequency is 6 GHz and the sample relative speed is 240 km/h, at least one pilot symbol is required every 0.32 ms. Correspondingly, the correlation time is 0.32 ms. When the sample carrier frequency is 6 GHz and the sample relative speed is 500 km/h, at least one pilot symbol is required every 0.15 ms. Correspondingly, the correlation time is 0.15 ms.

For another example, when the sample carrier frequency is 30 GHz and the sample relative speed is 3 km/h, at least one pilot symbol is required every 5 ms. Correspondingly, the correlation time is 5 ms. When the sample carrier frequency is 30 GHz and the sample relative speed is 140 km/h, at least one pilot symbol is required every 0.1 ms. Correspondingly, the correlation time is 0.1 ms. When the sample carrier frequency is 30 GHz and the sample relative speed is 240 km/h, at least one pilot symbol is required every 0.06 ms. Correspondingly, the correlation time is 0.06 ms. When the sample carrier frequency is 30 GHz and the sample relative speed is 500 km/h, at least one pilot symbol is required every 0.03 ms. Correspondingly, the correlation time is 0.03 ms.

When the sample carrier frequency is 63 GHz and the sample relative speed is 3 km/h, at least one pilot symbol is required every 2.4 ms. Correspondingly, the correlation time is 2.4 ms. When the sample carrier frequency is 63 GHz and the sample relative speed is 140 km/h, at least one pilot symbol is required every 0.05 ms. Correspondingly, the correlation time is 0.05 ms. When the sample carrier frequency is 63 GHz and the sample relative speed is 240 km/h, at least one pilot symbol is required every 0.03 ms. Correspondingly, the correlation time is 0.03 ms. When the sample carrier frequency is 63 GHz and the sample relative speed is 600 km/h, at least one pilot symbol is required every 0.0145 ms. Correspondingly, the correlation time is 0.0145 ms.

In view of the frame structure and subcarrier spacing features of the next-generation communication standards, the time domain is specifically designed as follows.

When the sample carrier frequency is 6 GHz and the sample relative speed is 3 km/h, at least one pilot symbol is required every 1 ms. Correspondingly, the pilot spacing is 1 ms. When the sample carrier frequency is 6 GHz and the sample relative speed is 140 km/h, at least one pilot symbol is required every 0.5 ms. Correspondingly, the pilot spacing is 0.5 ms. When the sample carrier frequency is 6 GHz and the sample relative speed is 240 km/h, at least one pilot symbol is required every 0.25 ms. Correspondingly, the pilot spacing is 0.25 ms. When the sample carrier frequency is 6 GHz and the sample relative speed is 600 km/h, at least one pilot symbol is required every 0.125 ms. Correspondingly, the pilot spacing is 0.125 ms.

In case that the sample carrier frequency is 6 GHz and the sample subcarrier spacing is 15 KHz, each subcarrier corresponds to one slot in the time domain, and one slot includes 14 OFDM symbols, one pilot symbol is required in every 14 OFDM symbols when the sample relative speed is 3 km/h. Correspondingly, the second pilot distribution corresponding to the sample carrier frequency of 6 GHz, the sample subcarrier spacing of 15 KHz and the sample relative speed of 3 km/h is one pilot symbol in every 14 OFDM symbols.

In case that the sample carrier frequency is 6 GHz and the sample subcarrier spacing is 30 KHz, each subcarrier corresponds to 2 slots in the time domain, and one slot includes 14 OFDM symbols, i.e., each subcarrier corresponds to 28 OFDM symbols, one pilot symbol is required in every 28 OFDM symbols when the sample relative speed is 3 km/h. Correspondingly, the second pilot distribution corresponding to the sample carrier frequency of 6 GHz, the sample subcarrier spacing of 30 KHz and the sample relative speed of 3 km/h is one pilot symbol in every 28 OFDM symbols.

In case that the sample carrier frequency is 6 GHz and the sample subcarrier spacing is 60 KHz, each subcarrier corresponds to 4 slots in the time domain, and one slot includes 14 OFDM symbols, i.e., each subcarrier corresponds to 56 OFDM symbols, one pilot symbol is required in every 56 OFDM symbols when the sample relative speed is 3 km/h. Correspondingly, the second pilot distribution corresponding to the sample carrier frequency of 6 GHz, the sample subcarrier spacing of 60 KHz and the sample relative speed of 3 km/h is one pilot symbol in every 56 OFDM symbols.

In case that the sample carrier frequency is 6 GHz and the sample subcarrier spacing is 15 KHz, each subcarrier corresponds to one slot in the time domain, and one slot includes 14 OFDM symbols, one pilot symbol is required in every 7 OFDM symbols when the sample relative speed is 140 km/h. Correspondingly, the second pilot distribution corresponding to the sample carrier frequency of 6 GHz, the sample subcarrier spacing of 15 KHz and the sample relative speed of 140 km/h is one pilot symbol in every 7 OFDM symbols.

In case that the sample carrier frequency is 6 GHz and the sample subcarrier spacing is 30 KHz, each subcarrier corresponds to one slot in the time domain, and one slot includes 14 OFDM symbols, one pilot symbol is required in every 14 OFDM symbols when the sample relative speed is 140 km/h. Correspondingly, the second pilot distribution corresponding to the sample carrier frequency of 6 GHz, the sample subcarrier spacing of 30 KHz and the sample relative speed of 140 km/h is one pilot symbol in every 14 OFDM symbols.

In case that the sample carrier frequency is 6 GHz and the sample subcarrier spacing is 60 KHz, each subcarrier corresponds to one slot in the time domain, and one slot includes 14 OFDM symbols, one pilot symbol is required in every 28 OFDM symbols when the sample relative speed is 140 km/h. Correspondingly, the second pilot distribution corresponding to the sample carrier frequency of 6 GHz, the sample subcarrier spacing of 60 KHz and the sample relative speed of 140 km/h is one pilot symbol in every 28 OFDM symbols.

In case that the sample carrier frequency is 6 GHz and the sample subcarrier spacing is 15 KHz, each subcarrier corresponds to one slot in the time domain, and one slot includes 14 OFDM symbols, 4 pilot symbols are required in every 14 OFDM symbols when the sample relative speed is 240 km/h. Correspondingly, the second pilot distribution corresponding to the sample carrier frequency of 6 GHz, the sample subcarrier spacing of 15 KHz and the sample relative speed of 240 km/h is 4 pilot symbols in every 14 OFDM symbols.

In case that the sample carrier frequency is 6 GHz and the sample subcarrier spacing is 30 KHz, each subcarrier corresponds to 2 slots in the time domain, and one slot includes 14 OFDM symbols, 4 pilot symbols are required in every 28 OFDM symbols when the sample relative speed is 240 km/h. Correspondingly, the second pilot distribution corresponding to the sample carrier frequency of 6 GHz, the sample subcarrier spacing of 30 KHz and the sample relative speed of 240 km/h is 4 pilot symbols in every 28 OFDM symbols.

In case that the sample carrier frequency is 6 GHz and the sample subcarrier spacing is 60 KHz, each subcarrier corresponds to 4 slots in the time domain, and one slot includes 14 OFDM symbols, 4 pilot symbols are required in every 56 OFDM symbols when the sample relative speed is 240 km/h. Correspondingly, the second pilot distribution corresponding to the sample carrier frequency of 6 GHz, the sample subcarrier spacing of 60 KHz and the sample relative speed of 240 km/h is 4 pilot symbols in every 56 OFDM symbols.

In case that the sample carrier frequency is 6 GHz and the sample subcarrier spacing is 15 KHz, each subcarrier corresponds to one slot in the time domain, and one slot includes 14 OFDM symbols, 7 pilot symbols are required in every 14 OFDM symbols when the sample relative speed is 500 km/h. Correspondingly, the second pilot distribution corresponding to the sample carrier frequency of 6 GHz, the sample subcarrier spacing of 15 KHz and the sample relative speed of 500 km/h is 7 pilot symbols in every 14 OFDM symbols.

In case that the sample carrier frequency is 6 GHz and the sample subcarrier spacing is 30 KHz, each subcarrier corresponds to 2 slots in the time domain, and one slot includes 14 OFDM symbols, 7 pilot symbols is required in every 28 OFDM symbols when the sample relative speed is 500 km/h. Correspondingly, the second pilot distribution corresponding to the sample carrier frequency of 6 GHz, the sample subcarrier spacing of 30 KHz and the sample relative speed of 500 km/h is 7 pilot symbols in every 28 OFDM symbols.

In case that the sample carrier frequency is 6 GHz and the sample subcarrier spacing is 60 KHz, each subcarrier corresponds to 4 slots in the time domain, and one slot includes 14 OFDM symbols, 7 pilot symbols is required in every 56

OFDM symbols when the sample relative speed is 500 km/h. Correspondingly, the second pilot distribution corresponding to the sample carrier frequency of 6 GHz, the sample subcarrier spacing of 60 KHz and the sample relative speed of 500 km/h is 7 pilot symbols in every 56 OFDM symbols.

In case that the sample carrier frequency is 30 GHz and the sample subcarrier spacing is 15 KHz, each subcarrier corresponds to one slot in the time domain, and one slot includes 14 OFDM symbols, one pilot symbol is required in every 14 OFDM symbols when the sample relative speed is 3 km/h. Correspondingly, the second pilot distribution corresponding to the sample carrier frequency of 6 GHz, the sample subcarrier spacing of 15 KHz and the sample relative speed of 3 km/h is one pilot symbol in every 14 OFDM symbols.

In case that the sample carrier frequency is 30 GHz and the sample subcarrier spacing is 30 KHz, each subcarrier corresponds to 2 slots in the time domain, and one slot includes 14 OFDM symbols, i.e., each subcarrier corresponds to 28 OFDM symbols, one pilot symbol is required in every 28 OFDM symbols when the sample relative speed is 3 km/h. Correspondingly, the second pilot distribution corresponding to the sample carrier frequency of 30 GHz, the sample subcarrier spacing of 30 KHz and the sample relative speed of 3 km/h is one pilot symbol in every 28 OFDM symbols.

In case that the sample carrier frequency is 30 GHz and the sample subcarrier spacing is 60 KHz, each subcarrier corresponds to 4 slots in the time domain, and one slot includes 14 OFDM symbols, i.e., each subcarrier corresponds to 56 OFDM symbols, one pilot symbol is required in every 56 OFDM symbols when the sample relative speed is 3 km/h. Correspondingly, the second pilot distribution corresponding to the sample carrier frequency of 30 GHz, the sample subcarrier spacing of 60 KHz and the sample relative speed of 3 km/h is one pilot symbol in every 56 OFDM symbols.

In case that the sample carrier frequency is 30 GHz and the sample subcarrier spacing is 120 KHz, each subcarrier corresponds to 8 slots in the time domain, and one slot includes 14 OFDM symbols, one pilot symbol is required in every 112 OFDM symbols when the sample relative speed is 3 km/h. Correspondingly, the second pilot distribution corresponding to the sample carrier frequency of 30 GHz, the sample subcarrier spacing of 120 KHz and the sample relative speed of 3 km/h is one pilot symbol in every 112 OFDM symbols.

In case that the sample carrier frequency is 30 GHz and the sample subcarrier spacing is 15 KHz, each subcarrier corresponds to one slot in the time domain, and one slot includes 14 OFDM symbols, 7 pilot symbols are required in every 14 OFDM symbols when the sample relative speed is 140 km/h. Correspondingly, the second pilot distribution corresponding to the sample carrier frequency of 30 GHz, the sample subcarrier spacing of 15 KHz and the sample relative speed of 140 km/h is 7 pilot symbols in every 14 OFDM symbols.

In case that the sample carrier frequency is 30 GHz and the sample subcarrier spacing is 30 KHz, each subcarrier corresponds to 2 slots in the time domain, and one slot includes 14 OFDM symbols, 7 pilot symbols are required in every 28 OFDM symbols when the sample relative speed is 140 km/h. Correspondingly, the second pilot distribution corresponding to the sample carrier frequency of 30 GHz, the sample subcarrier spacing of 30 KHz and the sample relative speed of 140 km/h is 7 pilot symbols in every 28 OFDM symbols.

In case that the sample carrier frequency is 30 GHz and the sample subcarrier spacing is 60 KHz, each subcarrier corresponds to 4 slots in the time domain, and one slot includes 14 OFDM symbols, 7 pilot symbols are required in every 56 OFDM symbols when the sample relative speed is 140 km/h. Correspondingly, the second pilot distribution corresponding to the sample carrier frequency of 30 GHz, the sample subcarrier spacing of 60 KHz and the sample relative speed of 140 km/h is 7 pilot symbols in every 56 OFDM symbols.

In case that the sample carrier frequency is 30 GHz and the sample subcarrier spacing is 120 KHz, each subcarrier corresponds to 8 slots in the time domain, and one slot includes 14 OFDM symbols, 7 pilot symbols are required in every 112 OFDM symbols when the sample relative speed is 140 km/h. Correspondingly, the second pilot distribution corresponding to the sample carrier frequency of 30 GHz, the sample subcarrier spacing of 120 KHz and the sample relative speed of 140 km/h is 7 pilot symbols in every 112 OFDM symbols.

In case that the sample carrier frequency is 30 GHz and the sample subcarrier spacing is 15 KHz, each subcarrier corresponds to one slot in the time domain, and one slot includes 14 OFDM symbols, 14 pilot symbols are required in every 14 OFDM symbols when the sample relative speed is 240 km/h. Correspondingly, the second pilot distribution corresponding to the sample carrier frequency of 30 GHz, the sample subcarrier spacing of 15 KHz and the sample relative speed of 240 km/h is 14 pilot symbols in every 14 OFDM symbols.

In case that the sample carrier frequency is 30 GHz and the sample subcarrier spacing is 30 KHz, each subcarrier corresponds to 2 slots in the time domain, and one slot includes 14 OFDM symbols, 14 pilot symbols are required in every 28 OFDM symbols when the sample relative speed is 240 km/h. Correspondingly, the second pilot distribution corresponding to the sample carrier frequency of 30 GHz, the sample subcarrier spacing of 30 KHz and the sample relative speed of 240 km/h is 14 pilot symbols in every 28 OFDM symbols.

In case that the sample carrier frequency is 30 GHz and the sample subcarrier spacing is 60 KHz, each subcarrier corresponds to 4 slots in the time domain, and one slot includes 14 OFDM symbols, 14 pilot symbols are required in every 56 OFDM symbols when the sample relative speed is 240 km/h. Correspondingly, the second pilot distribution corresponding to the sample carrier frequency of 30 GHz, the sample subcarrier spacing of 60 KHz and the sample relative speed of 240 km/h is 14 pilot symbols in every 56 OFDM symbols.

In case that the sample carrier frequency is 30 GHz and the sample subcarrier spacing is 120 KHz, each subcarrier corresponds to 8 slots in the time domain, and one slot includes 14 OFDM symbols, 14 pilot symbols are required in every 112 OFDM symbols when the sample relative speed is 240 km/h. Correspondingly, the second pilot distribution corresponding to the sample carrier frequency of 30 GHz, the sample subcarrier spacing of 120 KHz and the sample relative speed of 240 km/h is 14 pilot symbols in every 112 OFDM symbols.

In case that the sample carrier frequency is 30 GHz and the sample subcarrier spacing is 15 KHz, each subcarrier corresponds to one slot in the time domain, and one slot includes 14 OFDM symbols, 7 pilot symbols are required in every 14 OFDM symbols when the sample relative speed is 500 km/h. Correspondingly, the second pilot distribution corresponding to the sample carrier frequency of 30 GHz, the sample subcarrier spacing of 15 KHz and the sample relative speed of 500 km/h is 7 pilot symbols in every 14 OFDM symbols.

In case that the sample carrier frequency is 30 GHz and the sample subcarrier spacing is 30 KHz, each subcarrier corresponds to 2 slots in the time domain, and one slot includes 14 OFDM symbols, 7 pilot symbols are required in every 28 OFDM symbols when the sample relative speed is 500 km/h. Correspondingly, the second pilot distribution corresponding to the sample carrier frequency of 30 GHz, the sample subcarrier spacing of 30 KHz and the sample relative speed of 500 km/h is 7 pilot symbols in every 28 OFDM symbols.

In case that the sample carrier frequency is 30 GHz and the sample subcarrier spacing is 60 KHz, each subcarrier corresponds to 4 slots in the time domain, and one slot includes 14 OFDM symbols, 7 pilot symbols are required in every 56 OFDM symbols when the sample relative speed is 500 km/h. Correspondingly, the second pilot distribution corresponding to the sample carrier frequency of 30 GHz, the sample subcarrier spacing of 60 KHz and the sample relative speed of 500 km/h is 7 pilot symbols in every 56 OFDM symbols.

In case that the sample carrier frequency is 30 GHz and the sample subcarrier spacing is 120 KHz, each subcarrier corresponds to 8 slots in the time domain, and one slot includes 14 OFDM symbols, 28 pilot symbols are required in every 112 OFDM symbols when the sample relative speed is 500 km/h. Correspondingly, the second pilot distribution corresponding to the sample carrier frequency of 30 GHz, the sample subcarrier spacing of 120 KHz and the sample relative speed of 500 km/h is 28 pilot symbols in every 112 OFDM symbols.

In case that the sample carrier frequency is 63 GHz and the sample subcarrier spacing is 15 KHz, each subcarrier corresponds to one slot in the time domain, and one slot includes 14 OFDM symbols, one pilot symbol is required in every 14 OFDM symbols when the sample relative speed is 3 km/h. Correspondingly, the second pilot distribution corresponding to the sample carrier frequency of 63 GHz, the sample subcarrier spacing of 15 KHz and the sample relative speed of 3 km/h is one pilot symbol in every 14 OFDM symbols.

In case that the sample carrier frequency is 63 GHz and the sample subcarrier spacing is 30 KHz, each subcarrier corresponds to 2 slots in the time domain, and one slot includes 14 OFDM symbols, i.e., each subcarrier corresponds to 28 OFDM symbols, one pilot symbol is required in every 28 OFDM symbols when the sample relative speed is 3 km/h. Correspondingly, the second pilot distribution corresponding to the sample carrier frequency of 63 GHz, the sample subcarrier spacing of 30 KHz and the sample relative speed of 3 km/h is one pilot symbol in every 28 OFDM symbols.

In case that the sample carrier frequency is 63 GHz and the sample subcarrier spacing is 60 KHz, each subcarrier corresponds to 4 slots in the time domain, and one slot includes 14 OFDM symbols, i.e., each subcarrier corresponds to 56 OFDM symbols, one pilot symbol is required in every 56 OFDM symbols when the sample relative speed is 3 km/h. Correspondingly, the second pilot distribution corresponding to the sample carrier frequency of 63 GHz, the sample subcarrier spacing of 60 KHz and the sample relative speed of 3 km/h is one pilot symbol in every 56 OFDM symbols.

In case that the sample carrier frequency is 63 GHz and the sample subcarrier spacing is 120 KHz, each subcarrier corresponds to 8 slots in the time domain, and one slot includes 14 OFDM symbols, i.e., each subcarrier corresponds to 112 OFDM symbols, one pilot symbol is required in every 112 OFDM symbols when the sample relative speed is 3 km/h. Correspondingly, the second pilot distribution corresponding to the sample carrier frequency of 63 GHz, the sample subcarrier spacing of 120 KHz and the sample relative speed of 3 km/h is one pilot symbol in every 112 OFDM symbols.

In case that the sample carrier frequency is 63 GHz and the sample subcarrier spacing is 15 KHz, each subcarrier corresponds to one slot in the time domain, and one slot includes 14 OFDM symbols, 14 pilot symbols are required in every 14 OFDM symbols when the sample relative speed is 140 km/h. Correspondingly, the second pilot distribution corresponding to the sample carrier frequency of 63 GHz, the sample subcarrier spacing of 15 KHz and the sample relative speed of 140 km/h is 14 pilot symbols in every 14 OFDM symbols.

In case that the sample carrier frequency is 63 GHz and the sample subcarrier spacing is 30 KHz, each subcarrier corresponds to 2 slots in the time domain, and one slot includes 14 OFDM symbols, 14 pilot symbols are required in every 28 OFDM symbols when the sample relative speed is 140 km/h. Correspondingly, the second pilot distribution corresponding to the sample carrier frequency of 63 GHz, the sample subcarrier spacing of 15 KHz and the sample relative speed of 140 km/h is 14 pilot symbols in every 28 OFDM symbols.

In case that the sample carrier frequency is 63 GHz and the sample subcarrier spacing is 60 KHz, each subcarrier corresponds to 4 slots in the time domain, and one slot includes 14 OFDM symbols, 14 pilot symbols are required in every 56 OFDM symbols when the sample relative speed is 140 km/h. Correspondingly, the second pilot distribution corresponding to the sample carrier frequency of 63 GHz, the sample subcarrier spacing of 15 KHz and the sample relative speed of 140 km/h is 14 pilot symbols in every 56 OFDM symbols.

In case that the sample carrier frequency is 63 GHz and the sample subcarrier spacing is 120 KHz, each subcarrier corresponds to 8 slots in the time domain, and one slot includes 14 OFDM symbols, i.e., each subcarrier corresponds to 112 OFDM symbols, 14 pilot symbols are required in every 112 OFDM symbols when the sample relative speed is 140 km/h. Correspondingly, the second pilot distribution corresponding to the sample carrier frequency of 63 GHz, the sample subcarrier spacing of 120 KHz and the sample relative speed of 140 km/h is 14 pilot symbols in every 112 OFDM symbols.

In case that the sample carrier frequency is 63 GHz and the sample subcarrier spacing is 15 KHz, each subcarrier corresponds to one slot in the time domain, and one slot includes 14 OFDM symbols, 14 pilot symbols are required in every 14 OFDM symbols when the sample relative speed is 240 km/h. Correspondingly, the second pilot distribution corresponding to the sample carrier frequency of 63 GHz, the sample subcarrier spacing of 15 KHz and the sample relative speed of 240 km/h is 14 pilot symbols in every 14 OFDM symbols.

In case that the sample carrier frequency is 63 GHz and the sample subcarrier spacing is 30 KHz, each subcarrier corresponds to 2 slots in the time domain, and one slot includes 14 OFDM symbols, 14 pilot symbols are required in every 28 OFDM symbols when the sample relative speed is 240 km/h. Correspondingly, the second pilot distribution corresponding to the sample carrier frequency of 63 GHz, the sample subcarrier spacing of 30 KHz and the sample relative speed of 240 km/h is 14 pilot symbols in every 28 OFDM symbols.

In case that the sample carrier frequency is 63 GHz and the sample subcarrier spacing is 60 KHz, each subcarrier corresponds to 4 slots in the time domain, and one slot includes 14 OFDM symbols, 14 pilot symbols are required in every 56 OFDM symbols when the sample relative speed is 240 km/h. Correspondingly, the second pilot distribution corresponding to the sample carrier frequency of 63 GHz, the sample subcarrier spacing of 60 KHz and the sample relative speed of 240 km/h is 14 pilot symbols in every 56 OFDM symbols.

In case that the sample carrier frequency is 63 GHz and the sample subcarrier spacing is 120 KHz, each subcarrier corresponds to 8 slots in the time domain, and one slot includes 14 OFDM symbols, i.e., each subcarrier corresponds to 112 OFDM symbols, 14 pilot symbols are required in every 112 OFDM symbols when the sample relative speed is 240 km/h. Correspondingly, the second pilot distribution corresponding to the sample carrier frequency of 63 GHz, the sample subcarrier spacing of 120 KHz and the sample relative speed of 240 km/h is 14 pilot symbols in every 112 OFDM symbols.

In case that the sample carrier frequency is 63 GHz and the sample subcarrier spacing is 15 KHz, each subcarrier corresponds to one slot in the time domain, and one slot includes 14 OFDM symbols, 14 pilot symbols are required in every 14 OFDM symbols when the sample relative speed is 500 km/h. Correspondingly, the second pilot distribution corresponding to the sample carrier frequency of 63 GHz, the sample subcarrier spacing of 15 KHz and the sample relative speed of 500 km/h is 14 pilot symbols in every 14 OFDM symbols.

In case that the sample carrier frequency is 63 GHz and the sample subcarrier spacing is 30 KHz, each subcarrier corresponds to one slot in the time domain, and one slot includes 14 OFDM symbols, 28 pilot symbols are required in every 28 OFDM symbols when the sample relative speed is 500 km/h. Correspondingly, the second pilot distribution corresponding to the sample carrier frequency of 63 GHz, the sample subcarrier spacing of 30 KHz and the sample relative speed of 500 km/h is 28 pilot symbols in every 28 OFDM symbols.

In case that the sample carrier frequency is 63 GHz and the sample subcarrier spacing is 60 KHz, each subcarrier corresponds to one slot in the time domain, and one slot includes 14 OFDM symbols, 56 pilot symbols are required in every 56 OFDM symbols when the sample relative speed is 500 km/h. Correspondingly, the second pilot distribution corresponding to the sample carrier frequency of 63 GHz, the sample subcarrier spacing of 60 KHz and the sample relative speed of 500 km/h is 56 pilot symbols in every 56 OFDM symbols.

In case that the sample carrier frequency is 63 GHz and the sample subcarrier spacing is 120 KHz, each subcarrier corresponds to 8 slots in the time domain, and one slot includes 14 OFDM symbols, i.e., each subcarrier corresponds to 112 OFDM symbols, 56 pilot symbols are required in every 112 OFDM symbols when the sample relative speed is 240 km/h. Correspondingly, the second pilot distribution corresponding to the sample carrier frequency of 63 GHz, the sample subcarrier spacing of 120 KHz and the sample relative speed of 240 km/h is 56 pilot symbols in every 112 OFDM symbols.

In step 6023, the base station generates a first communication protocol based on a plurality of sample carrier frequencies, a plurality of sample subcarrier spacings and a plurality of sample first pilot distributions, and generates a second communication protocol based on the plurality of sample carrier frequencies, the plurality of sample subcarrier spacings, a plurality of sample relative speed ranges corresponding to the plurality of sample relative speeds and the plurality of sample second pilot distributions.

The base station has obtained the plurality of sample first pilot distributions based on the plurality of sample carrier frequencies and the plurality of sample subcarrier spacings. In this step, the base station stores the correspondence relationship between the sample carrier frequency, the sample subcarrier spacing and the sample first pilot distribution, and adds the correspondence relationship to the first communication protocol. The base station has obtained the plurality of sample second pilot distributions based on the plurality of sample carrier frequencies, the plurality of sample subcarrier spacings and the plurality of sample relative speeds. In this step, the base station determines the plurality of sample relative speed ranges according to the plurality of sample relative speeds, stores the correspondence relationship between the sample carrier frequency, the sample subcarrier spacing, the sample relative speed range and the sample second pilot frequency distribution, and adds the correspondence relationship to the second communication protocol.

It should be noted that the above steps 601-602 only need to be performed for one time. When the first device performs channel estimation, the first communication protocol and the second communication protocol may be used directly without repeatedly obtaining the first and second communication protocol.

It should be also noted that the first communication protocol and the second communication protocol may be an identical communication protocol, or may be two different communication protocols. When the first communication protocol and the second communication protocol are the identical communication protocol, the communication protocol is stored with the correspondence relationship between carrier frequencies, subcarrier spacings and first pilot distributions, as well as the correspondence relationship between carrier frequencies, subcarrier spacings and second pilot distributions.

In step 603, the base station returns the first communication protocol and the second communication protocol to the first device.

The obtaining request carries a device identifier of the first device. In this step, the base station sends the first communication protocol and the second communication protocol to the first device according to the device identifier of the first device. The notification signaling may bear the first and second communication protocol. Furthermore, the first communication protocol and the second communication protocol may be bore in an identical notification signaling or in two different notification signaling, which is not specifically limited in the embodiments of the disclosure.

In step 604, the first device receives the first communication protocol and the second communication protocol sent by the base station.

After the first device receives the first and second communication protocol, the first device stores the first and second communication protocol so that the pilot symbols are determined based on the stored first and second communication protocol in subsequent information interaction with other devices.

In step 605, when a first message is transmitted between the first device and a second device, the first device determines an RB bearing the first message.

The first device sends an assigning request to the base station. The assigning request is configured to request the base station to assign RBs for the first device and carries a device identifier of the first device. The base station receives the assigning request sent by the first device, assigns at least one RB for the first device and sends an identifier of the at least one RB to the first device. The first device receives the identifier of at least one RB sent by the base station, and determines an RB corresponding to the identifier of at least one RB in the resource pool based on the identifier of at least one RB.

In step 606, the first device determines at least one pilot symbol in the RB bearing the first message based on the first communication protocol and the second communication protocol.

This step may be implemented through the following steps 6061-6063.

In step 6061, the first device determines the carrier frequency and subcarrier spacing of subcarriers included in the RB, and determines the relative speed between the first device and the second device.

The second device may be a base station or a second terminal in the vehicle. When the second device is a base station, the step of determining by the first device the relative speed between the first device and the second device may be that, the first device determines a moving speed of the first device as the relative speed between the first device and the second device. When the second device is a second terminal, the step of determining by the first device the relative speed between the first device and the second device may be that, the first device determines a moving speed and a moving direction of the first device, determines a moving speed and a moving direction of the second device, and determines the relative speed between the first device and the second device according to the moving speed and moving direction of the first device and the moving speed and moving direction of the second device.

In step 6062, the first device obtains a first pilot distribution of pilot symbols in the RB in the frequency domain from a stored first communication protocol according to the carrier frequency and the subcarrier spacing. The first communication protocol is stored with a correspondence relationship between carrier frequencies, subcarrier spacings, and first pilot distributions.

For example, when the carrier frequency corresponding to the subcarrier in the RB is 63 GHz and the subcarrier spacing is 240 KHz, the first pilot distribution corresponding to the carrier frequency and the subcarrier spacing, which is obtained by the first device from the first communication protocol according to the carrier frequency of 63 GHz and the subcarrier spacing of 240 KHz, is that there is at least one pilot symbol in every 4 REs.

In step 6062, the first device obtains a second pilot distribution of pilot symbols in the RB in the time domain from a stored second communication protocol according to the carrier frequency, the subcarrier frequency, and the relative speed between the first device and the second device. The second communication protocol is stored with a correspondence relationship between carrier frequencies, subcarrier frequencies, relative speed ranges and second pilot distributions.

For example, when the carrier frequency corresponding to the subcarrier in the RB is 63 GHz, the subcarrier spacing is 240 KHz and the relative speed between the first device and the second device is 240 km/h, the second pilot distribution corresponding to the carrier frequency, the subcarrier spacing and the relative speed, which is obtained by the first device from the second communication protocol according to the carrier frequency of 63 GHz, the subcarrier spacing of 240 KHz and the relative speed of 240 KHz, is that there is one pilot symbol in every 4 OFDM symbols.

In step 6063, the first device sets at least one pilot symbol in the RB according to the first pilot distribution and the second pilot distribution.

The first device directly configures at least one pilot symbol in the RB. The at least one pilot symbol satisfies the first pilot distribution in the frequency domain and satisfies the second pilot distribution in the time domain. The pilot symbols may be evenly distributed or unevenly distributed in the time domain. Similarly, the pilot symbols may also be evenly distributed or unevenly distributed in the frequency domain.

In the embodiments of the disclosure, it is taken as an example for description that the pilot symbols are evenly distributed in the time domain and evenly distributed in the frequency domain. For example, the first pilot distribution is that there is at least one pilot symbol in every 4 REs, and the second pilot distribution is that there is one pilot symbol in every 4 OFDM symbols. Since one RB includes 12 REs in the frequency domain from the $1^{st}$ RE to the $12^{th}$ RE respectively. In the time domain, 14 OFDM symbols are included, from the $1^{st}$ OFDM symbol to the $14^{th}$ OFDM symbol respectively. The first device sets 3 pilot symbols in the frequency domain and 4 pilot symbols in the time domain. The first device may evenly select 3 REs in the frequency domain, namely the $1^{st}$, $5^{th}$ and $9^{th}$ REs, or the $2^{nd}$, $6^{th}$ and $10^{th}$ REs, or the $3^{rd}$, $7^{th}$ and $11^{th}$ REs, or the $4^{th}$, $8^{th}$ and $12^{th}$ REs and determine the selected REs as the pilots. The first device may select the $1^{st}$, $5^{th}$, $9^{th}$ and $13^{th}$ OFDM symbols in the time domain, or the $2^{nd}$, $6^{th}$, $10^{th}$ and $14^{th}$ OFDM symbols, and determine the selected OFDM symbols as the pilot symbols. For example, referring to FIG. 7, it is taken as an example in FIG. 7 that the $4^{th}$, $8^{th}$ and $12^{th}$ REs are used as the pilots and the $2^{nd}$, $6^{th}$, $10^{th}$ and $14^{th}$ OFDM symbols are used as the pilot symbols.

In step 607, the first device estimates a current channel based on at least one pilot symbol.

The first device may estimate the current channel based on at least one pilot symbol in the RB, or the first device may estimate the current channel only based on at least one pilot symbol of some REs in the RB. When the first device estimates the current channel based on at least one pilot symbol of some REs in the RB, this step may be implemented through the following steps 6071-6073.

In step 6071, the first device determines a number of symbols occupied by the current channel in the time domain.

A correspondence relationship between channel widths and a number of symbols is stored in the first device. Correspondingly, this step may be that, the first device determines the number of symbols corresponding to the channel width from the correspondence relationship between channel widths and the number of symbols according to the channel width of the current channel.

In step 6072, the first device determines a plurality of target REs in the RB according to the number of symbols and a number of subcarriers included in the RB.

Figure 7:
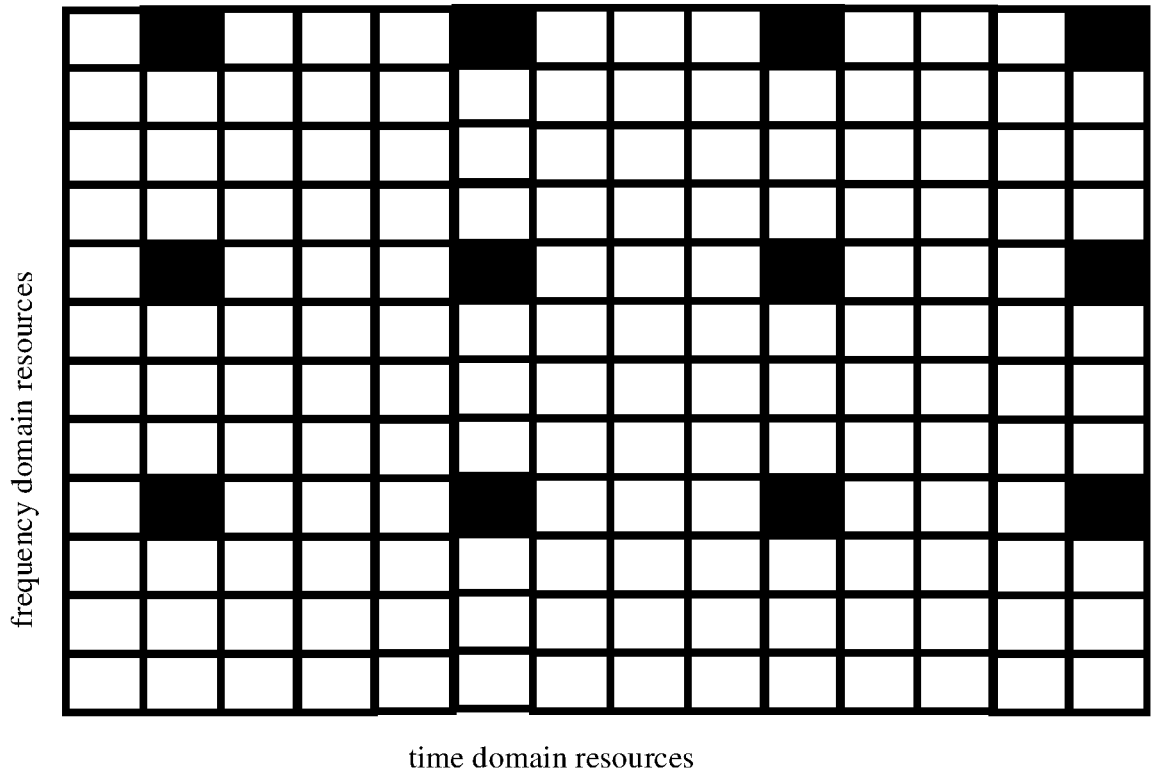
FIG. 7 is a schematic diagram illustrating setting a pilot symbol in an RB according to an exemplary embodiment.
Figure 8:
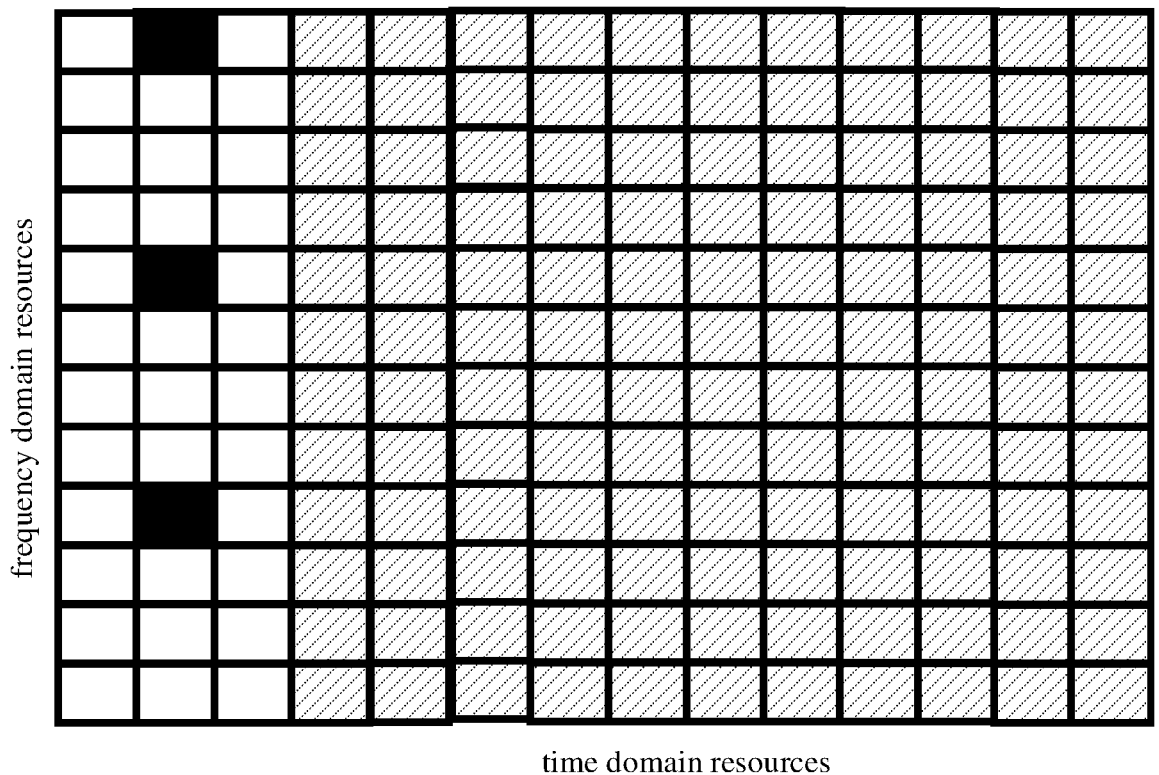
FIG. 8 is a schematic diagram illustrating setting a pilot symbol in an RB according to an exemplary embodiment.
Figure 9:
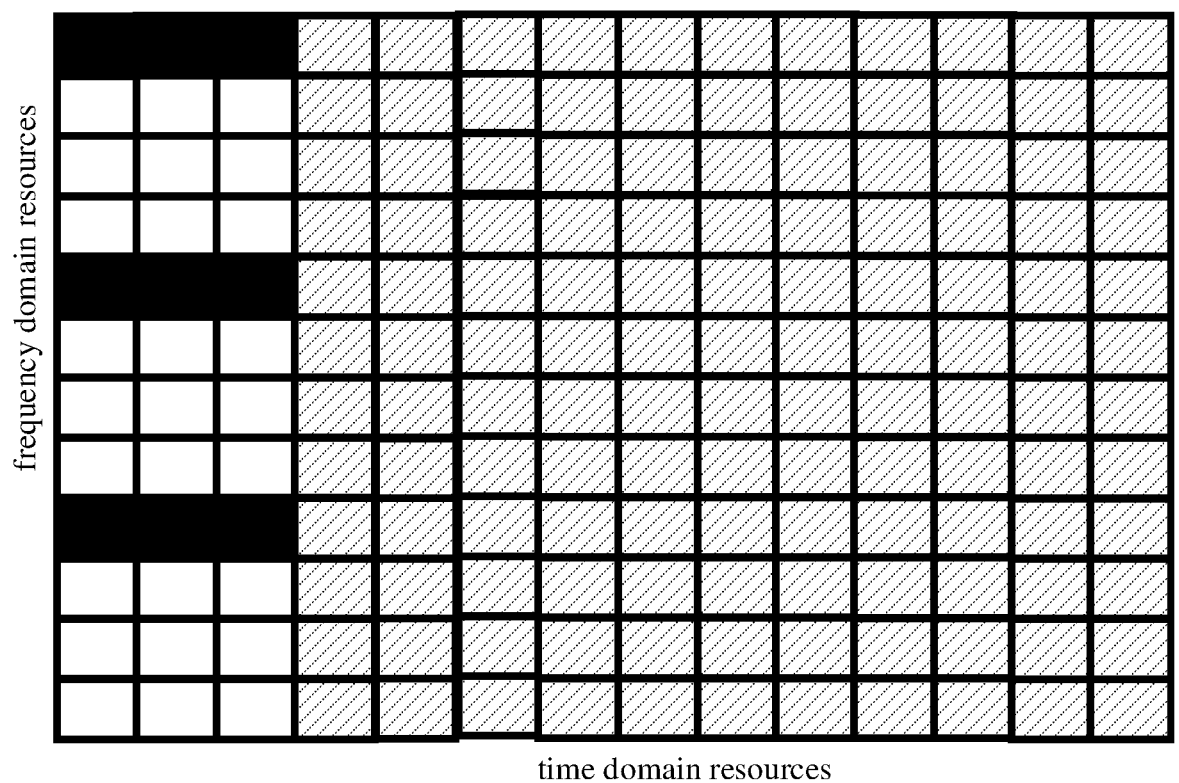
FIG. 9 is a schematic diagram illustrating setting a pilot symbol in an RB according to an exemplary embodiment.

The first device selects the symbol number of OFDM symbols in the time domain of RB according to the number of symbols, and determines REs in the frequency domain for the selected OFDM symbol as the plurality of target REs. The selected OFDM symbols may be continuous or discontinuous. In the embodiments of the disclosure, the selection method is not specifically limited. For example, the selected OFDM symbols may be continuous, and the number of symbols is 3, then the first device may select the $1^{st}$, $2^{nd}$, and $3^{rd}$ OFDM symbols. Or, the first device may select the $2^{nd}$, $4^{th}$, and $6^{th}$ OFDM symbols. In FIG. 7, it is taken as an example for description that the first device selects the $2^{nd}$, $6^{th}$, $10^{th}$ and $14^{th}$ OFDM symbols and sets all of them as pilot symbols. In FIG. 8, it is taken as an example for description that the first device selects the $1^{st}$, $2^{nd}$, and $3^{rd}$ OFDM symbols and sets the $2^{nd}$ OFDM symbol as the pilot symbol. In FIG. 9, it is taken as an example for description that the first device selects the $1^{st}$, $2^{nd}$ and $3^{rd}$ OFDM symbols and sets all of them as pilot symbols.

In step 6073, the first device estimates the current channel based on at least one pilot symbol in the plurality of target REs.

In the embodiment of the disclosure, at least one pilot symbol is determined in the RB according to the carrier frequency, the subcarrier spacing, and the relative speed. Since the carrier frequency and the relative speed are considered, the set pilot symbol matches the carrier frequency and the relative speed, thereby improving the accuracy of the determined pilot symbol, and further improving the accuracy of channel estimation.

Figure 10:
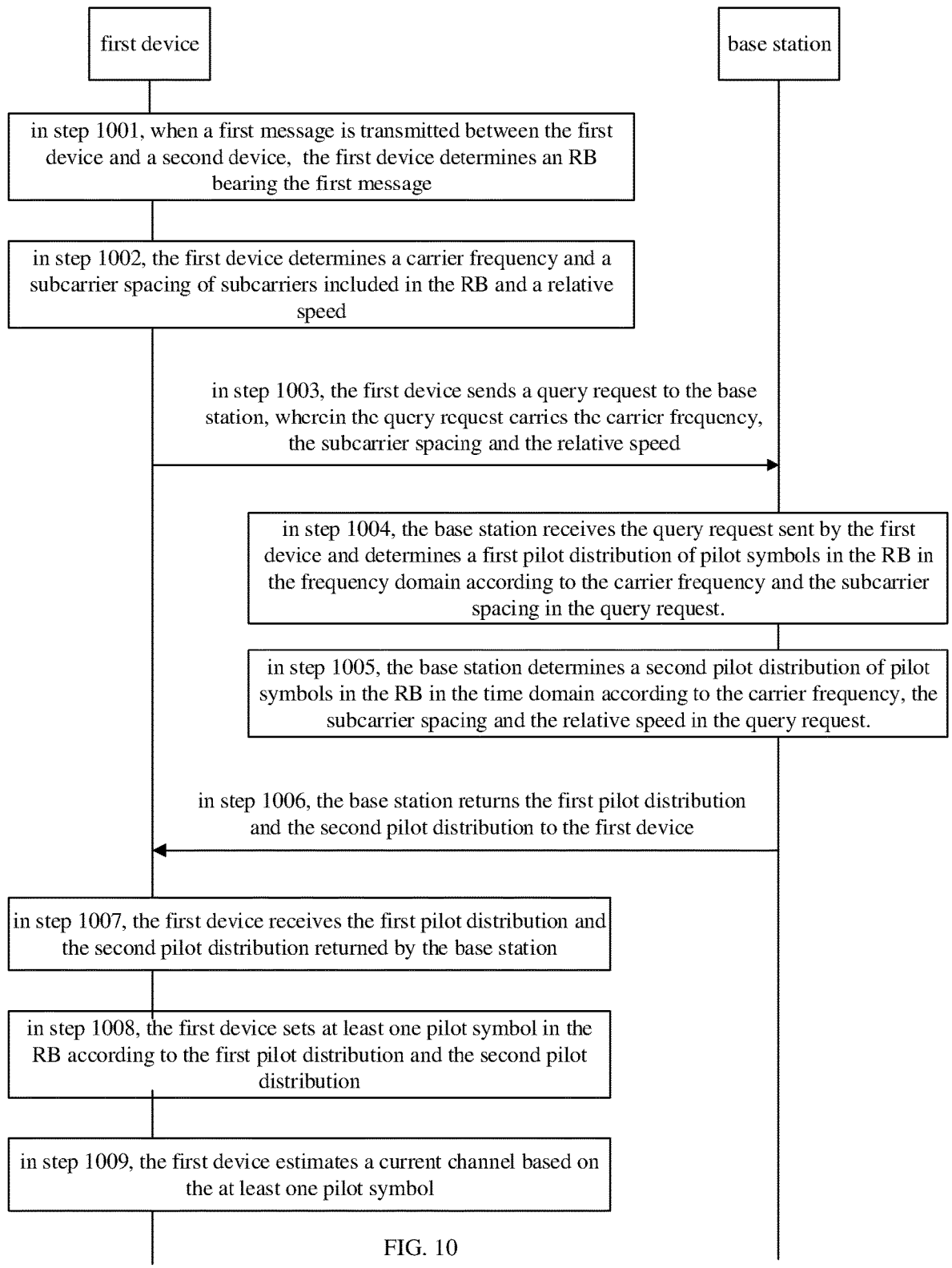
FIG. 10 is a flow chart illustrating another method for channel estimation according to an exemplary embodiment.

FIG. 10 is a flow chart illustrating a method for channel estimation according to another exemplary embodiment. In the embodiment of the disclosure, it is taken as an example for description that the first device queries distribution information from the base station in which the distribution information is the first and second pilot distribution, and determines at least one pilot symbol in the RB based on the first and second pilot distribution. As illustrated in FIG. 10, the method for channel estimation may include the following steps.

In step 1001, when a first message is transmitted between the first device and a second device, the first device determines an RB bearing the first message.

This step may be the same as step 605, which will not be repeated here.

In step 1002, the first device determines a carrier frequency and a subcarrier spacing of the subcarriers included in the RB and a relative speed.

This step is the same as step 6061, which will not be repeated here.

In step 1003, the first device sends a query request to the base station, wherein the query request carries the carrier frequency, the subcarrier spacing, and the relative speed.

In step 1004, the base station receives the query request sent by the first device, and determines a first pilot distribution of pilot symbols in the RB in the frequency domain according to the carrier frequency and subcarrier spacing in the query request.

The first communication protocol is stored in the base station, and the base station obtains the first pilot distribution of pilot symbols in the RB in the frequency domain from the first communication protocol according to the carrier frequency and the subcarrier spacing.

In step 1005, the base station determines a second pilot distribution of pilot symbols in the RB in the time domain according to the carrier frequency, the subcarrier spacing, and relative speed in the query request.

The second communication protocol is stored in the base station, and the base station obtains the second pilot distribution of pilot symbols in the RB in the time domain from the second communication protocol according to the carrier frequency, the subcarrier spacing and the relative speed.

In step 1006, the base station returns the first pilot distribution and the second pilot distribution to the first device.

The query request also carries a device identifier of the first device; the base station returns the first pilot distribution and the second pilot distribution to the first device according to the device identifier of the first device.

In step 1007, the first device receives the first pilot distribution and the second pilot distribution returned by the base station.

In step 1008, the first device sets at least one pilot symbol in the RB according to the first pilot distribution and the second pilot distribution.

This step is the same as step 6063, which will not be repeated here.

In step 1009, the first device estimates a current channel based on at least one pilot symbol.

This step is the same as step 607, which will not be repeated here.

In the embodiment of the disclosure, at least one pilot symbol is determined in the RB according to the carrier frequency, the subcarrier spacing, and the relative speed. Since the carrier frequency and the relative speed are considered, the set pilot symbol matches the carrier frequency and the relative speed, thereby improving the accuracy of the determined pilot symbol, and further improving the accuracy of channel estimation.

Figure 11:
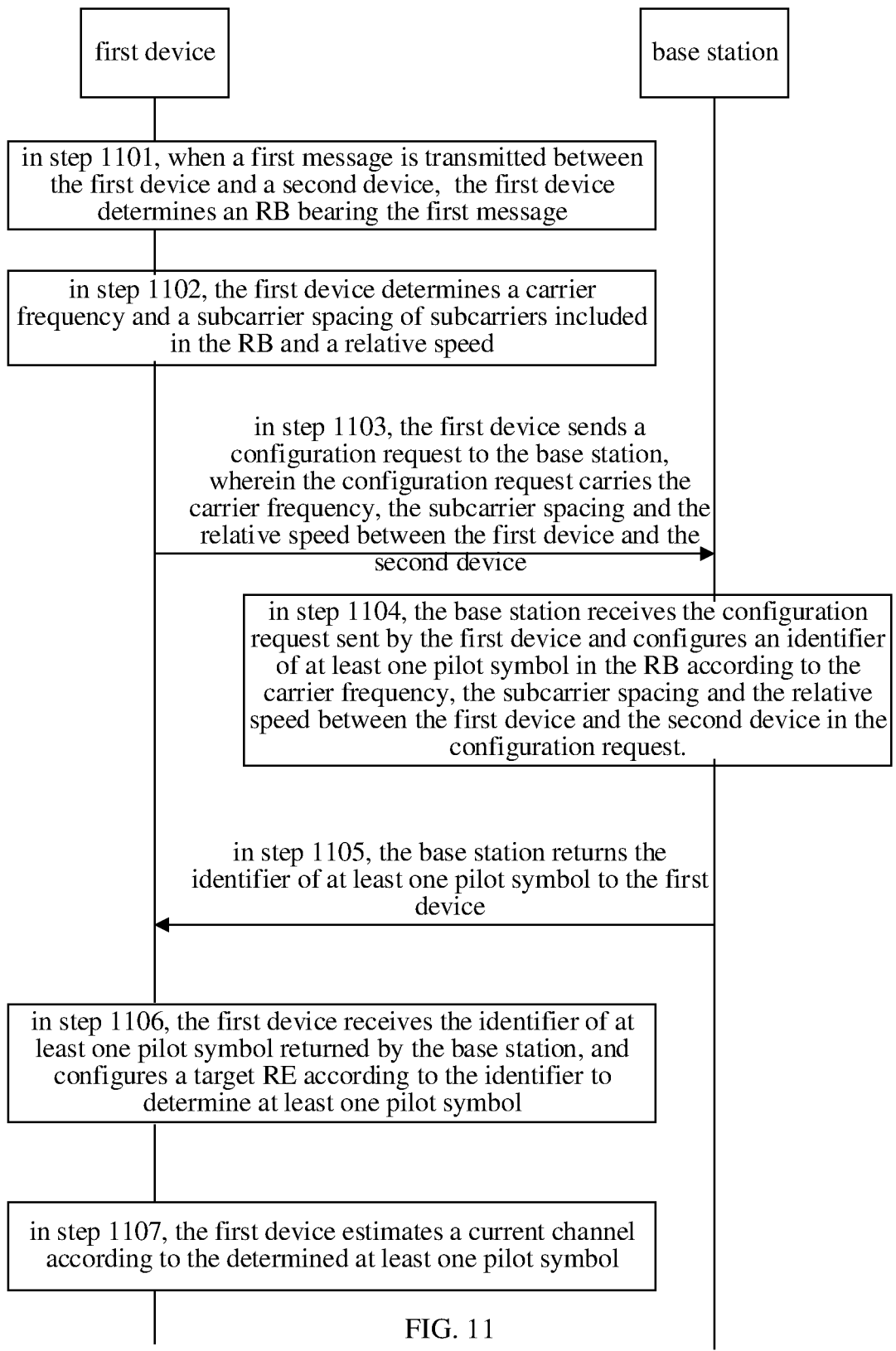
FIG. 11 is a flow chart illustrating another method for channel estimation according to an exemplary embodiment.

FIG. 11 is a flow chart illustrating a method for channel estimation according to another exemplary embodiment. In the embodiment of the disclosure, it is taken as an example for description that the base station returns the distribution information of pilot symbols in which the distribution information is an identifier of pilot symbol, and the first device determines at least one pilot symbol in the RB directly based on the identifier of pilot symbol. As illustrated in FIG. 11, the method for channel estimation may include the following steps.

In step 1101, when a first message is transmitted between the first device and a second device, the first device determines the RB bearing the first message.

This step may be the same as step 605, which will not be repeated here.

In step 1102, the first device determines a carrier frequency and a subcarrier spacing of subcarriers included in the RB and a relative speed.

This step is the same as step 6061, which will not be repeated here.

In step 1103, the first device sends a configuration request to the base station. The configuration request carries the carrier frequency, the subcarrier spacing, and the relative speed between the first device and the second device.

It should be noted that in this step, the configuration request may also carry only the carrier frequency, so that the base station configures at least one pilot symbol in the RB according to the carrier frequency.

In step 1104, the base station receives the configuration request sent by the first device and configures an identifier of at least one pilot symbol in the RB according to the carrier frequency, the subcarrier spacing, and the relative speed between the first device and the second device in the configuration request.

The base station determines the first pilot distribution of pilot symbols in the frequency domain according to the carrier frequency and the subcarrier spacing, determines the second pilot distribution of pilot symbols in the time domain according to the carrier frequency, the subcarrier spacing, and the relative speed, configures at least one pilot symbol in the RB according to the first pilot distribution and the second pilot distribution, and determines the identifier of at least one pilot symbol.

The process of determining by the base station the first pilot distribution of pilot symbols in the frequency domain according to the carrier frequency and the subcarrier spacing is the same as the process in step 1004, which will not be repeated here. The process of determining by the base station the second pilot distribution of pilot symbols in the time domain according to the carrier frequency, the subcarrier spacing, and the relative speed is the same as the process in step 705, which will not be repeated here. The steps of configuring at least one pilot symbol in the RB according to the first and second pilot distribution and determining the identifier of at least one pilot symbol by the base station are the same as step 6063 of configuring at least one pilot symbol in the RB according to the first and second pilot distribution and determining the identifier of at least one pilot symbol by the first device, which will not be repeated here.

It should be noted that when the configuration request carries only the carrier frequency, the base station queries a plurality of first pilot distributions corresponding to the carrier frequency from the first communication protocol according to the carrier frequency, determines the first pilot distribution with the densest distribution of pilot symbols from the plurality of first pilot distributions, queries a plurality of second pilot distributions corresponding to the carrier frequency from the second communication protocol according to the carrier frequency, and determines the second pilot distribution with the densest distribution of pilot symbols from the plurality of second pilot distributions. The base station configures at least one pilot symbol in the RB based on the selected first and second pilot distribution.

For example, in case that the carrier frequency is 6 GHz, the subcarrier spacing is 15 KHz and the relative speed between the first device and the second device is 3 km/h, the base station may obtain that the position of pilot symbol in the time domain of RB is in any one of 14 OFDM symbols.

In case that the carrier frequency is 6 GHz, the subcarrier spacing is 15 KHz and the relative speed between the first device and the second device is 140 km/h, the base station may obtain that the position of pilot symbol in the time domain of RB is (1, 8) or (2, 9) etc.

For another example, in case that the carrier frequency is 6 GHz, the subcarrier spacing is 15 KHz and the relative speed between the first device and the second device is 240 km/h, the base station may obtain that the position of pilot symbol in the time domain of RB is (1, 5, 9, 13) or (2, 6, 10, 14) or (3, 7, 11, 14) etc.

For another example, in case that the carrier frequency is 6 GHz, the subcarrier spacing is 15 KHz and the relative speed between the first device and the second device is 500 km/h, the base station may obtain that the position of the pilot symbol in the time domain of RB is (1, 3, 5, 7, 9, 11, 13) or (2, 4, 6, 8, 10, 12, 14) etc.

For example, in case that the carrier frequency is 6 GHz, the subcarrier spacing is 30 KHz and the relative speed between the first device and the second device is 3 km/h, the base station may obtain that the position of pilot symbol in the time domain of RB is in any one of 28 OFDM symbols.

In case that the carrier frequency is 6 GHz, the subcarrier spacing is 30 KHz and the relative speed between the first device and the second device is 140 km/h, the base station may obtain that the position of pilot symbol in the time domain of RB is (1, 15) or (2, 16) etc.

For another example, in case that the carrier frequency is 6 GHz, the subcarrier spacing is 30 KHz and the relative speed between the first device and the second device is 240 km/h, the base station may obtain that the position of pilot symbol in the time domain of RB is (1, 9, 17, 21) or (2, 10, 18, 26) or (3, 11, 19, 27) etc.

For another example, in case that the carrier frequency is 6 GHz, the subcarrier spacing is 30 KHz and the relative speed between the first device and the second device is 500 km/h, the base station may obtain that the position of pilot symbol in the time domain of RB is (1, 5, 9, 13, 17, 21, 25) or (2, 6, 10, 14, 18, 22, 26) etc.

For example, in case that the carrier frequency is 6 GHz, the subcarrier spacing is 60 KHz and the relative speed between the first device and the second device is 3 km/h, the base station may obtain that the position of pilot symbol in the time domain of RB is in any one of 56 OFDM symbols.

In case that the carrier frequency is 6 GHz, the subcarrier spacing is 60 KHz and the relative speed between the first device and the second device is 140 km/h, the base station may obtain that the position of pilot symbol in the time domain of RB is (1, 29) or (2, 30) etc.

For another example, in case that the carrier frequency is 6 GHz, the subcarrier spacing is 60 KHz and the relative speed between the first device and the second device is 240 km/h, the base station may obtain that the position of pilot symbol in the time domain of RB is (1, 17, 33, 49) or (2, 18, 34, 50) or (3, 19, 35, 51) etc.

For another example, in case that the carrier frequency is 6 GHz, the subcarrier spacing is 60 KHz and the relative speed between the first device and the second device is 500 km/h, the base station may obtain that the position of pilot symbol in the time domain of RB is (1, 9, 17, 25, 33, 41, 49) or (2, 10, 18, 26, 34, 42, 50) etc.

For example, in case that the carrier frequency is 30 GHz, the subcarrier spacing is 15 KHz and the relative speed between the first device and the second device is 3 km/h, the base station may obtain that the position of pilot symbol in the time domain of RB is in any one of 14 OFDM symbols.

In case that the carrier frequency is 30 GHz, the subcarrier spacing is 15 KHz and the relative speed between the first device and the second device is 140 km/h, the base station may obtain that the position of pilot symbol in the time domain of RB is (1, 3, 5, 7, 9, 11, 13) or (2, 4, 6, 8, 10, 12, 14) etc.

For another example, in case that the carrier frequency is 30 GHz, the subcarrier spacing is 15 KHz and the relative speed between the first device and the second device is 240 km/h, the base station may obtain that the position of pilot symbol in the time domain of RB is (1, 2, 3, 4, 5, 6, 7, 8, 9, 10, 11, 12, 13, 14) etc.

For another example, in case that the carrier frequency is 30 GHz, the subcarrier spacing is 15 KHz and the relative speed between the first device and the second device is 500 km/h, the base station may obtain that the position of pilot symbol in the time domain of RB is (1, 2, 3, 4, 5, 6, 7, 8, 9, 10, 11, 12, 13, 14) etc.

For example, in case that the carrier frequency is 30 GHz, the subcarrier spacing is 30 KHz and the relative speed between the first device and the second device is 3 km/h, the base station may obtain that the position of pilot symbol in the time domain of RB is in any one of 28 OFDM symbols.

In case that the carrier frequency is 30 GHz, the subcarrier spacing is 30 KHz and the relative speed between the first device and the second device is 140 km/h, the base station may obtain that the position of pilot symbol in the time domain of RB is (1, 5, 9, 13, 17, 21, 25) or (2, 6, 10, 14, 18, 22, 26) etc.

For another example, in case that the carrier frequency is 30 GHz, the subcarrier spacing is 30 KHz and the relative speed between the first device and the second device is 240 km/h, the base station may obtain that the position of pilot symbol in the time domain of RB is (1, 3, 5, 7, 9, 11, 13, 15, 17, 19, 21, 23, 25, 27) or (2, 4, 6, 8, 10, 12, 14, 16, 18, 20, 22, 24, 26, 28) etc.

For another example, in case that the carrier frequency is 30 GHz, the subcarrier spacing is 30 KHz and the relative speed between the first device and the second device is 500 km/h, the base station may obtain that the position of pilot symbol in the time domain of RB is (1-28).

For example, in case that the carrier frequency is 30 GHz, the subcarrier spacing is 60 KHz and the relative speed between the first device and the second device is 3 km/h, the base station may obtain that the position of pilot symbol in the time domain of RB is in any one of 56 OFDM symbols.

In case that the carrier frequency is 30 GHz, the subcarrier spacing is 60 KHz and the relative speed between the first device and the second device is 140 km/h, the base station may obtain that the position of pilot symbol in the time domain of RB is (1, 9, 17, 25, 33, 41, 49) or (2, 10, 18, 26, 34, 42, 50).

For another example, in case that the carrier frequency is 30 GHz, the subcarrier spacing is 60 KHz and the relative speed between the first device and the second device is 240 km/h, the base station may obtain that the position of pilot symbol in the time domain of RB is (1, 5, 9, 13, 17, 21, 25, 29, 33, 37, 41, 45, 49, 53) or (2, 6, 10, 14, 18, 22, 26, 30, 34, 38, 42, 46, 50, 54) etc.

For another example, in case that the carrier frequency is 30 GHz, the subcarrier spacing is 60 KHz and the relative speed between the first device and the second device is 500 km/h, the base station may obtain that the position of pilot symbol in the time domain of RB is in one of every 2 OFDM symbols, which is not listed here.

For example, in case that the carrier frequency is 30 GHz, the subcarrier spacing is 120 KHz and the relative speed between the first device and the second device is 3 km/h, the base station may obtain that the position of pilot symbol in the time domain of RB is in any one of 112 OFDM symbols.

In case that the carrier frequency is 30 GHz, the subcarrier spacing is 120 KHz and the relative speed between the first device and the second device is 140 km/h, the base station may obtain that the position of pilot symbol in the time domain of RB is in one of every 16 OFDM symbols, which is not listed here.

For another example, in case that the carrier frequency is 30 GHz, the subcarrier spacing is 120 KHz and the relative speed between the first device and the second device is 240 km/h, the base station may obtain that the position of pilot symbol in the time domain of RB is in one of every 8 OFDM symbols, which is not listed here.

For another example, in case that the carrier frequency is 30 GHz, the subcarrier spacing is 120 KHz and the relative speed between the first device and the second device is 500 km/h, the base station may obtain that the position of pilot symbol in the time domain of RB is in one of every 4 OFDM symbols, which is not listed here.

For example, in case that the carrier frequency is 63 GHz, the subcarrier spacing is 15 KHz and the relative speed between the first device and the second device is 3 km/h, the base station may obtain that the position of pilot symbol in the time domain of RB is in any one of 14 OFDM symbols.

In case that the carrier frequency is 63 GHz, the subcarrier spacing is 15 KHz and the relative speed between the first device and the second device is 140 km/h, the base station may obtain that the position of pilot symbol in the time domain of RB is (1, 2, 3, 4, 5, 6, 7, 8, 9, 10, 11, 12, 13, 14) etc.

For another example, in case that the carrier frequency is 63 GHz, the subcarrier spacing is 15 KHz and the relative speed between the first device and the second device is 240 km/h, the base station may obtain that the position of pilot symbol in the time domain of RB is (1, 2, 3, 4, 5, 6, 7, 8, 9, 10, 11, 12, 13, 14) etc.

For another example, in case that the carrier frequency is 63 GHz, the subcarrier spacing is 15 KHz and the relative speed between the first device and the second device is 500 km/h, the base station may obtain that the position of pilot symbol in the time domain of RB is (1, 2, 3, 4, 5, 6, 7, 8, 9, 10, 11, 12, 13, 14) etc.

For example, in case that the carrier frequency is 63 GHz, the subcarrier spacing is 30 KHz and the relative speed between the first device and the second device is 3 km/h, the base station may obtain that the position of pilot symbol in the time domain of RB is in any one of 28 OFDM symbols.

In case that the carrier frequency is 63 GHz, the subcarrier spacing is 30 KHz and the relative speed between the first device and the second device is 140 km/h, the base station may obtain that the position of pilot symbol in the time domain of RB is in one of every 2 OFDM symbols, which is not listed here.

For another example, in case that the carrier frequency is 63 GHz, the subcarrier spacing is 30 KHz and the relative speed between the first device and the second device is 240 km/h, the base station may obtain that the position of pilot symbol in the time domain of RB is (1-28) etc.

For another example, in case that the carrier frequency is 63 GHz, the subcarrier spacing is 30 KHz and the relative speed between the first device and the second device is 500 km/h, the base station may obtain that the position of pilot symbol in the time domain of RB is (1-28).

For example, in case that the carrier frequency is 63 GHz, the subcarrier spacing is 60 KHz and the relative speed between the first device and the second device is 3 km/h, the base station may obtain that the position of the pilot symbol of the RB in the time domain in any one of 56 OFDM symbols.

In case that the carrier frequency is 63 GHz, the subcarrier spacing is 60 KHz and the relative speed between the first device and the second device is 140 km/h, the base station may obtain that the position of pilot symbol in the time domain of RB is in one of every 4 OFDM symbols, which is not listed here.

For another example, in case that the carrier frequency is 63 GHz, the subcarrier spacing is 60 KHz and the relative speed between the first device and the second device is 240 km/h, the base station may obtain that the position of pilot symbol in the time domain of RB is in one of every 2 OFDM symbols, which is not listed here.

For another example, in case that the carrier frequency is 63 GHz, the subcarrier spacing is 60 KHz and the relative speed between the first device and the second device is 500 km/h, the base station may obtain that the position of pilot symbol in the time domain of RB is (1-56) etc.

For example, in case that the carrier frequency is 63 GHz, the subcarrier spacing is 120 KHz and the relative speed between the first device and the second device is 3 km/h, the base station may obtain that the position of the pilot symbol of the RB in the time domain is any one of 112 OFDM symbols.

In case that the carrier frequency is 63 GHz, the subcarrier spacing is 120 KHz and the relative speed between the first device and the second device is 140 km/h, the base station may obtain that the position of pilot symbol in the time domain of RB is in one of every 8 OFDM symbols, which is not listed here.

For another example, in case that the carrier frequency is 63 GHz, the subcarrier spacing is 120 KHz and the relative speed between the first device and the second device is 240 km/h, the base station may obtain that the position of pilot symbol in the time domain of RB is in one of every 4 OFDM symbols, which is not listed here.

For another example, in case that the carrier frequency is 63 GHz, the subcarrier spacing is 120 KHz and the relative speed between the first device and the second device is 500 km/h, the base station may obtain that the position of pilot symbol in the time domain of RB is in one of every 2 OFDM symbols, which is not listed here.

Figure 12:
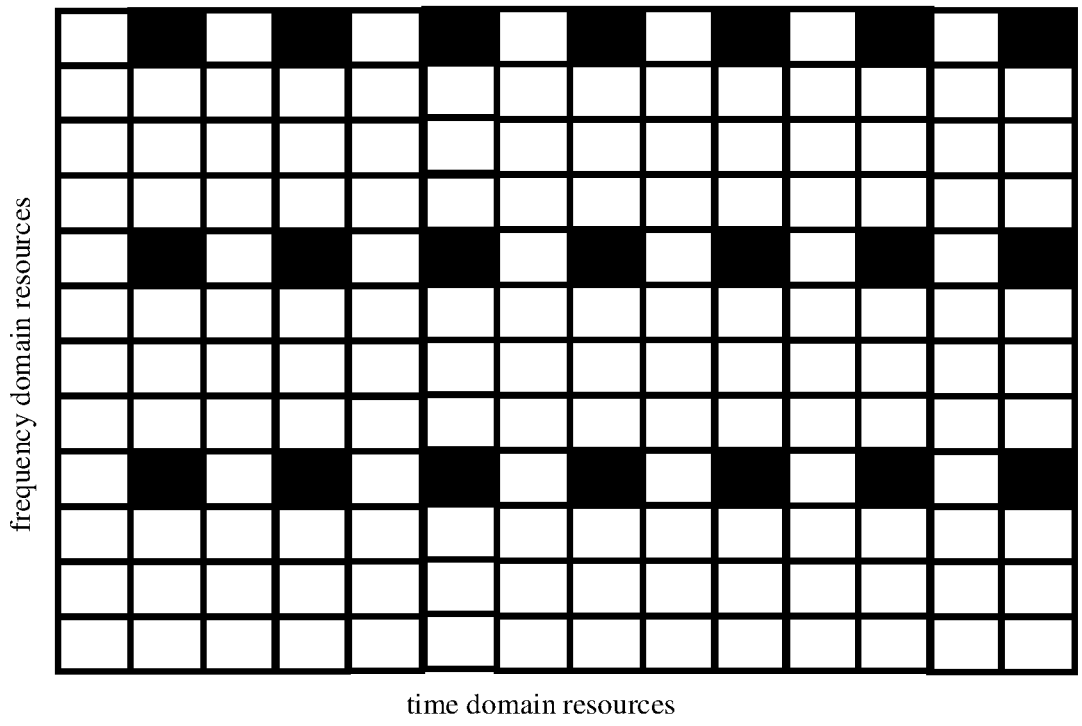
FIG. 12 is a schematic diagram illustrating setting a pilot symbol in an RB according to an exemplary embodiment.
Figure 13:
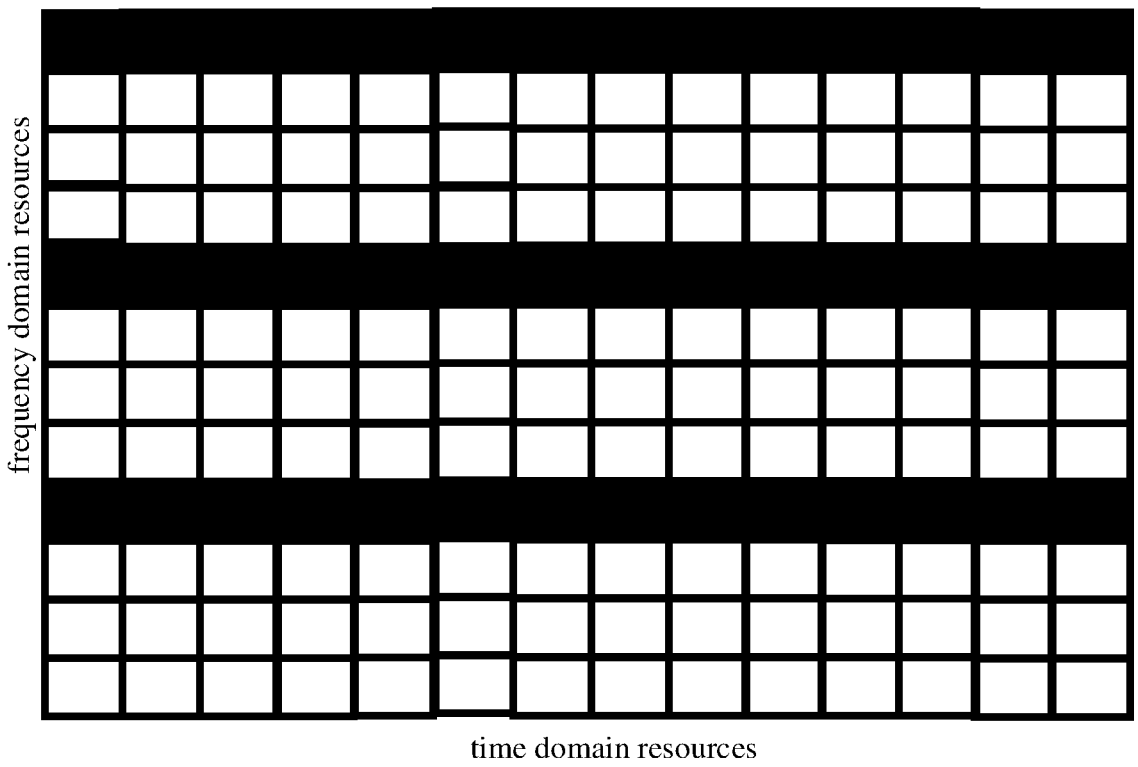
FIG. 13 is a schematic diagram illustrating setting a pilot symbol in an RB according to an exemplary embodiment.

In another possible implementation, the base station may also determine only according to the carrier frequency of 6 GHz. Correspondingly, when the carrier frequency is 6 GHz, the base station may select one RE from the 4 REs in the frequency domain of RB as a pilot and there are 7 pilot symbols in 14 OFDM symbols in the time domain. For example, the $4^{th}$, $8^{th}$, and $12^{th}$ RE are selected in the frequency domain, and the positions of pilot symbols in the time domain are (2, 4, 6, 8, 10, 12, 14) or (1, 3, 5, 7, 9, 11, 13) as illustrated in FIG. 12. When the carrier frequency is 30 GHz and 63 GHz, the base station may select one RE from the 4 REs in the frequency domain of RB as a pilot and there are 14 pilot symbols in 14 OFDM symbols in the time domain as illustrated in the FIG. 13.

The step of configuring by the base station at least one pilot symbol in the RB based on the selected first and second pilot distribution is the same as the steps of configuring at least one pilot symbol in the RB according to the first and second pilot distribution and determining the identifier of at least one pilot symbol by the first device, which will not be repeated here.

In the embodiment of the disclosure, it is an optimal matching configuration scheme that the base station determines the identifier of at least one pilot symbol according to the carrier frequency, the subcarrier spacing and the relative speed carried in the configuration request, thereby improving the accuracy of channel estimation. When the base station only determines the identifier of at least one pilot symbol based on the carrier frequency carried in the configuration request, the configuration efficiency may be improved.

In step 1105, the base station returns the identifier of at least one pilot symbol to the first device.

In step 1106, the first device receives the identifier of at least one pilot symbol returned by the base station, and configures a target RE according to the identifier to determine at least one pilot symbol.

In step 1107, the first device estimates a current channel according to the determined at least one pilot symbol.

This step is the same as step 607, which will not be repeated here.

In the embodiment of the disclosure, at least one pilot symbol is determined in the RB according to the carrier frequency, the subcarrier spacing, and the relative speed. Since the carrier frequency and the relative speed are considered, the set pilot symbol matches the carrier frequency and the relative speed, thereby improving the accuracy of the determined pilot symbol, and further improving the accuracy of channel estimation.

FIG. 14 is a block diagram illustrating an apparatus for channel estimation according to another exemplary embodiment. The apparatus is applied to a first device to execute the steps performed by the first device in the method for channel estimation described above. Referring to FIG. 14, the apparatus includes a first determining module 1401, a second determining module 1402 and an estimating module 1403.

The first determining module 1401 is configured to, when a first message is transmitted between the first device and a second device, determine a resource block RB bearing the first message.

The second determining module 1402 is configured to determine at least one pilot symbol in the RB according to a carrier frequency and a subcarrier spacing of subcarriers included in the RB and a relative speed between the first device and the second device.

The estimating module 1403 is configured to estimate a current channel based on the at least one pilot symbol.

In a possible implementation, the second determining module 1402 is further configured to determine a first pilot distribution of pilot symbols in the RB in a frequency domain according to the carrier frequency and the subcarrier spacing, and determine a second pilot distribution of pilot symbols in the RB in a time domain according to the carrier frequency, the subcarrier spacing and the relative speed; and set at least one pilot symbol in the RB according to the first pilot distribution and the second pilot distribution.

In a possible implementation, the second determining module 1402 is further configured to obtain the first pilot distribution of pilot symbols in the RB in the frequency domain from a stored first communication protocol according to the carrier frequency and the subcarrier spacing; and obtain the second pilot distribution of pilot symbols in the RB in the time domain from a stored second communication protocol according to the carrier frequency, the subcarrier spacing and the relative speed. The first communication protocol is stored with a correspondence relationship between carrier frequencies, subcarrier spacings, and first pilot distributions. The second communication protocol is stored with a correspondence relationship between carrier frequencies, subcarrier spacings, relative speed ranges, and second pilot distributions.

In a possible implementation, the second determining module 1402 is further configured to send a query request to a base station; and receive the first pilot distribution and the second pilot distribution returned by the base station. The query request carries the carrier frequency, the subcarrier spacing and the relative speed, and the query request is configured for the base station to determine the first pilot distribution of pilot symbols in the RB in the frequency domain according to the carrier frequency and the subcarrier spacing and determine the second pilot distribution of pilot symbols in the RB in the time domain according to the carrier frequency, the subcarrier spacing and the relative speed.

In a possible implementation, the estimation module 1403 is further configured to determine a number of symbols occupied by the current channel in time domain; determine a plurality of target resource elements RE in the RB according to the number of symbols and a number of subcarriers included in the RB; and estimate the current channel based on at least one pilot symbol in the plurality of target REs.

In a possible implementation, the apparatus further includes a first sending module and a first receiving module.

The first sending module configured to send an obtaining request to a base station. The obtaining request is configured to obtain the first communication protocol and the second communication protocol. The first receiving module is configured to receive the first communication protocol and the second communication protocol returned by the base station.

In a possible implementation, the second determining module 1402 is further configured to send a configuration request to a base station; receive an identifier of the at least one pilot symbol returned by the base station; and determine the at least one pilot symbol in the RB based on the identifier of the at least one pilot symbol. The configuration request carries the carrier frequency, the subcarrier spacing and the relative speed, and the configuration request is configured for the base station to configure at least one pilot symbol in the RB based on the carrier frequency, the subcarrier spacing and the relative speed.

In the embodiment of the disclosure, at least one pilot symbol is determined in the RB according to the carrier frequency, the subcarrier spacing, and the relative speed. Since the carrier frequency and the relative speed are considered, the set pilot symbol matches the carrier frequency and the relative speed, thereby improving the accuracy of the determined pilot symbol, and further improving the accuracy of channel estimation.

FIG. 15 is a block diagram illustrating an apparatus for channel estimation according to another exemplary embodiment. The apparatus is applied to a base station to execute the steps performed by the base station in the method for channel estimation described above. Referring to FIG. 15, the apparatus includes an assigning module 1501, a third determining module 1502 and a second sending module 1503.

The assigning module 1501 is configured to, when a first message is transmitted between a first device and a second device, assign a resource block RB bearing the first message to the first device.

The third determining module 1502 is configured to determine distribution information of at least one pilot symbol in the RB according to a carrier frequency and a subcarrier spacing of subcarriers included in the RB and a relative speed between the first device and the second device.

The second sending module 1503 is configured to return the distribution information of at least one pilot symbol to the first device. The distribution information is configured for the first device to determine the at least one pilot symbol in the RB, and estimate a current channel based on the at least one pilot symbol.

In a possible implementation, the distribution information includes a first pilot distribution and a second pilot distribution. The third determining module 1502 is further configured to receive a query request sent by the first device, wherein the query request carries the carrier frequency, the subcarrier spacing and the relative speed; determine the first pilot distribution of pilot symbols in the RB in the frequency domain according to the carrier frequency and the subcarrier spacing; and determine the second pilot distribution of pilot symbols in the RB in the time domain according to the carrier frequency, the subcarrier spacing, and the relative speed.

In a possible implementation, the distribution information includes an identifier of pilot symbol. The third determining module 1502 is further configured to receive a configuration request sent by the first device; determine a first pilot distribution of pilot symbols in the RB in the frequency domain according to the carrier frequency and the subcarrier spacing; determine a second pilot distribution of pilot symbols in the RB in the time domain according to the carrier frequency, the subcarrier spacing and the relative speed; set at least one pilot symbol in the RB according to the first pilot distribution and the second pilot distribution; and determine the identifier of the at least one pilot symbol. The configuration request carries the carrier frequency, the subcarrier spacing and the relative speed.

In the embodiment of the disclosure, at least one pilot symbol is determined in the RB according to the carrier frequency, the subcarrier spacing, and the relative speed. Since the carrier frequency and the relative speed are considered, the set pilot symbol matches the carrier frequency and the relative speed, thereby improving the accuracy of the determined pilot symbol, and further improving the accuracy of channel estimation.

FIG. 16 is a block diagram illustrating an apparatus for channel estimation according to another exemplary embodiment. The apparatus is applied to a base station to execute the steps performed by the base station in the method for channel estimation described above. Referring to FIG. 16, the apparatus includes a second receiving module 1601 and a third sending module 1602.

The second receiving module 1601 is configured to receive an obtaining request sent by a first device. The obtaining request is configured to obtain a first communication protocol and a second communication protocol. The first communication protocol is stored with a correspondence relationship between carrier frequencies, subcarrier spacings, and first pilot distributions. The second communication protocol is stored with a correspondence relationship between carrier frequencies, subcarrier spacings, relative speed ranges, and second pilot distributions.

The third sending module 1602 is configured to return the first communication protocol and the second communication protocol to the first device, such that the first device determines at least one pilot symbol in a resource block RB bearing a first message based on the first communication protocol and the second communication protocol, and estimates a current channel based on the at least one pilot symbol. The first message is transmitted between the first device and a second device.

In a possible implementation, the apparatus further includes a fourth determining module and a generating module.

The fourth determining module is configured to determine a plurality of sample carrier frequencies, a plurality of sample subcarrier spacings, and a plurality of sample relative speeds, determine a plurality of sample first pilot distributions according to the plurality of sample carrier frequencies and the plurality of sample subcarrier spacings, and determine a plurality of sample second pilot distributions according to the plurality of sample carrier frequencies and the plurality of sample relative speeds.

The generating module is configured to generate the first communication protocol based on the plurality of sample carrier frequencies, the plurality of sample subcarrier spacings and the plurality of sample first pilot distributions, and generate the second communication protocol based on the plurality of sample carrier frequencies, the plurality of sample subcarrier spacings, a plurality of relative speed ranges corresponding to the plurality of sample relative speeds, and the plurality of sample second pilot distributions.

In the embodiment of the disclosure, at least one pilot symbol is determined in the RB according to the carrier frequency, the subcarrier spacing, and the relative speed.

Since the carrier frequency and the relative speed are considered, the set pilot symbol matches the carrier frequency and the relative speed, thereby improving the accuracy of the determined pilot symbol, and further improving the accuracy of channel estimation.

It should be noted that when the apparatus for channel estimation according to the above embodiments displays a notification bar message, only the division of the above functional modules is used as an example for description. In practical applications, the above functions may be allocated by different functional modules as required, That is, the internal structure of the apparatus is divided into different functional modules to complete all or part of the functions described above. In addition, the apparatus for channel estimation according to the embodiments described above belongs to the same concept as the embodiments of the method for channel estimation. For the specific implementations, please refer to the method embodiments, which will not be repeated here.

Figure 17:
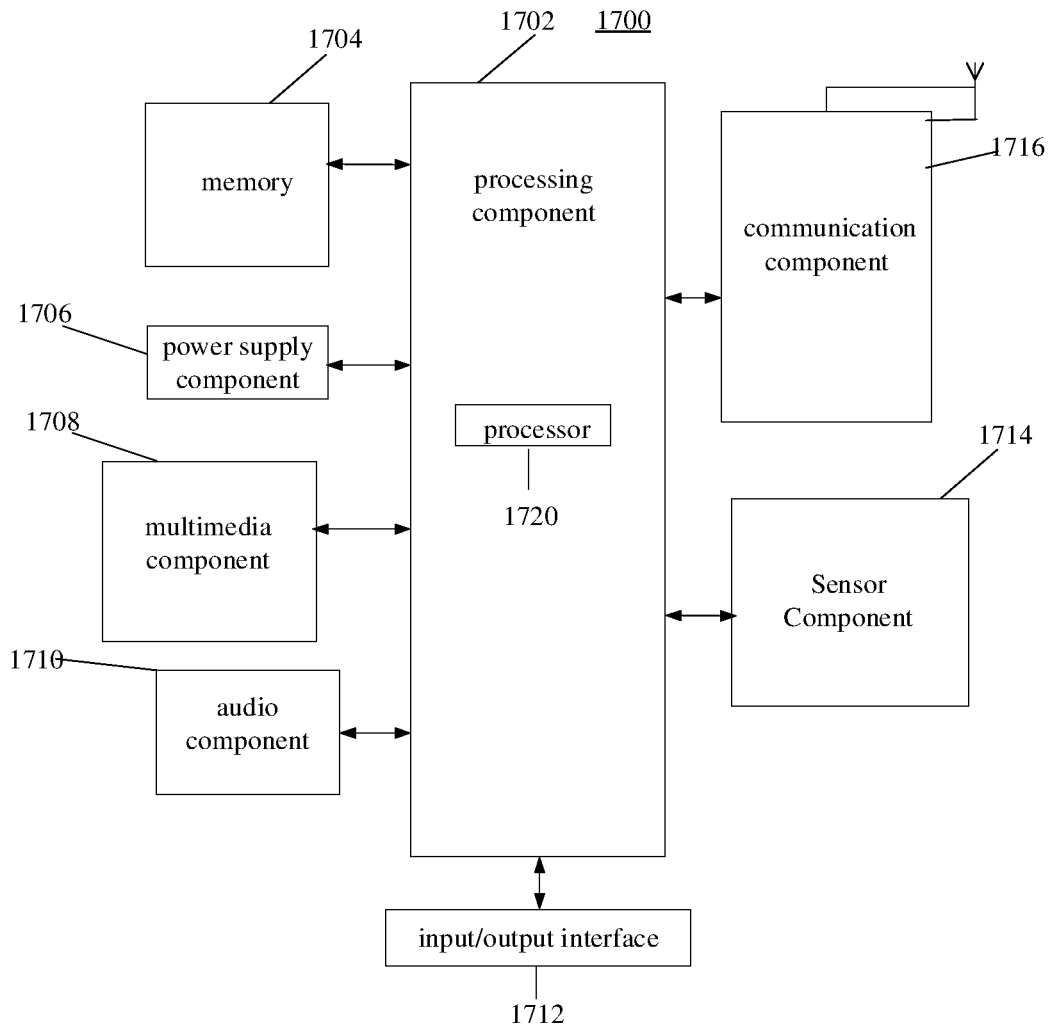
FIG. 17 is a block diagram illustrating a device according to an exemplary embodiment.

FIG. 17 is a block diagram illustrating a device 1700 for channel estimation according to an exemplary embodiment. For example, the device 1700 may be a mobile phone, a computer, a digital broadcasting terminal, a messaging device, a game console, a tablet device, a medical device, a fitness device, a personal digital assistant, etc.

Referring to FIG. 17, the device 1700 may include one or more of the following components: a processing component 1702, a memory 1704, a power supply component 1706, a multimedia component 1708, an audio component 1710, an input/output (I/O) interface 1712, a sensor component 1714, and a communication component 1716.

The processing component 1702 typically controls the overall operations of the device 1700, such as operations associated with display, telephone calls, data communications, camera operations, and recording operations. The processing component 1702 may include one or more processors 1720 to execute instructions to perform all or part of the steps of the above described method. In addition, the processing component 1702 may include one or more modules which facilitate the interaction between the processing component 1702 and other components. For example, the processing component 1702 may include a multimedia module which facilitates the interaction between the multimedia component 1708 and the processing component 1702.

The memory 1704 is configured to store various types of data to support operations in the device 1700. Examples of such data include instructions for any application or method operating on the device 1700, contact data, phone book data, messages, pictures, videos, etc. The memory 1704 may be implemented by any type of volatile or non-volatile storage device or their combination, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power supply component 1706 provides power to various components of the device 1700. The power supply component 1706 may include a power management system, one or more power supplies, and other components associated with the generation, management, and distribution of power for the device 1700.

The multimedia component 1708 includes a screen that provides an output interface between the device 1700 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of the touch or slide action, but also sense a period of time and a pressure associated with the touch or swipe action. In some embodiments, the multimedia component 1708 includes a front camera and/or a rear camera. When the device 1700 is in an operation mode, such as a photographing mode or a video mode, the front camera and/or the rear camera may receive external multimedia data. Each front camera and rear camera may be a fixed optical lens system or have focal length and optical zoom capabilities.

The audio component 1710 is configured to output and/or input audio signals. For example, the audio component 1710 includes a microphone (MIC) configured to receive external audio signals when the device 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker for outputting audio signals.

The I/O interface 1712 provides an interface between the processing component 1702 and the peripheral interface module. The peripheral interface module may be a keyboard, a click wheel, a button, and the like. These buttons may include but are not limited to, a home button, a volume button, a starting button, and a locking button.

The sensor component 1714 includes one or more sensors for providing the device 1700 with various aspects of state evaluation. For example, the sensor component 1714 can detect the open/close status of the device 1700 and the relative positioning of components. For example, the component is the display and the keypad of the device 1700. The sensor component 1714 may detect an open/closed status of the device 1700, relative positioning of components, e.g., the display and the keypad, of the device 1700, a change in position of the device 1700 or a component of the device 1700, a presence or absence of user contact with the device 1700, an orientation or an acceleration/deceleration of the device 1700, and a change in temperature of the device 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an accelerometer sensor, a gyroscope sensor, a magnetic sensor, a pressure sensor, or a temperature sensor.

The communication component 1716 is configured to facilitate communication, wired or wirelessly, between the device 1700 and other devices. The device 1700 may access a wireless network based on a communication standard, such as WiFi, 2G or 3G, or a combination thereof. In one exemplary embodiment, the communication component 1716 receives a broadcast signal or broadcast associated information from an external broadcast management system via a broadcast channel In one exemplary embodiment, the communication component 1716 further includes a near field communication (NFC) module to facilitate short-range communication. For example, the NFC module may be implemented based on a radio frequency identifier (RFID) technology, an infrared data association (IrDA) technology, an ultra-wideband (UWB) technology, a Bluetooth (BT) technology, and other technologies.

In an exemplary embodiment, the device 1700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, for implementing the above methods for channel estimation.

In an exemplary embodiment, there is also provided a non-transitory computer-readable storage medium including instructions, such as the memory 1704, executable by the processor 1720 in the device 1700, for performing the above-described methods. For example, the non-transitory computer-readable storage medium may be a ROM, a RAM, a CD-ROM, a magnetic tape, a floppy disc, an optical data storage device, and the like.

Figure 18:
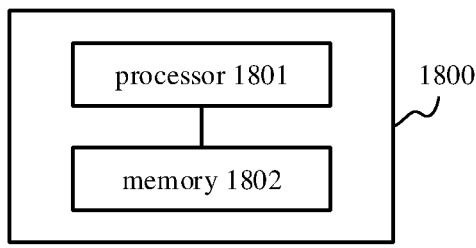
FIG. 18 is a block diagram illustrating a base station according to an exemplary embodiment.

FIG. 18 is a structural schematic diagram of a base station according to an embodiment of the disclosure. The base station 1800 may have relatively large differences due to different configurations or performances, and may include one or more central processing units (CPUs) 1801 and one or more than one memory 1802. The memory 1802 has at least one instruction stored thereon, which is loaded and executed by the processor 1801 to implement the methods according to the above described method embodiments. Of course, the base station may also have components for inputting and outputting such as a wired or wireless network interface, a keyboard and an input and output interface. The base station may also include other components for implementing device functions, which will not be repeated here.

Other implementations of the disclosure will be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the exaction construction that has been described above and illustrated in the accompanying drawings, and that various modifications and changes may be made without departing from the scope thereof. The scope of the disclosure only be limited by the appended claims.

What is claimed is:

1. A method for channel estimation, applied to a first device, and comprising:
when a first message is transmitted between the first device and a second device, determining a resource block (RB) bearing the first message;
determining at least one pilot symbol in the RB according to a carrier frequency and a subcarrier spacing of subcarriers included in the RB and a relative speed between the first device and the second device; and
estimating a current channel based on the at least one pilot symbol,
wherein estimating the current channel based on the at least one pilot symbol comprises:
determining a number of symbols occupied by the current channel in a time domain;
determining a plurality of target resource elements (REs) in the RB according to the number of symbols and a number of subcarriers included in the RB; and
estimating the current channel based on at least one pilot symbol in the plurality of target REs.

2. The method of claim 1, wherein determining at least one pilot symbol in the RB according to the carrier frequency and the subcarrier spacing of subcarriers included in the RB and the relative speed between the first device and the second device comprises:
determining a first pilot distribution of pilot symbols in the RB in a frequency domain according to the carrier frequency and the subcarrier spacing, and determining a second pilot distribution of pilot symbols in the RB in a time domain according to the carrier frequency, the subcarrier spacing and the relative speed; and
setting at least one pilot symbol in the RB according to the first pilot distribution and the second pilot distribution.

3. The method of claim 2, wherein determining the first pilot distribution of pilot symbols in the RB in the frequency domain according to the carrier frequency and the subcarrier spacing, and determining the second pilot distribution of pilot symbols in the RB in the time domain according to the carrier frequency, the subcarrier spacing and the relative speed comprises:
obtaining the first pilot distribution of pilot symbols in the RB in the frequency domain from a stored first communication protocol according to the carrier frequency and the subcarrier spacing, wherein the first communication protocol is stored with a correspondence relationship between carrier frequencies, subcarrier spacings, and first pilot distributions; and
obtaining the second pilot distribution of pilot symbols in the RB in the time domain from a stored second communication protocol according to the carrier frequency, the subcarrier spacing and the relative speed, wherein the second communication protocol is stored with a correspondence relationship between carrier frequencies, subcarrier spacings, relative speed ranges, and second pilot distributions.

4. The method of claim 2, wherein determining the first pilot distribution of pilot symbols in the RB in the frequency domain according to the carrier frequency and the subcarrier spacing, and determining the second pilot distribution of pilot symbols in the RB in the time domain according to the carrier frequency, the subcarrier spacing and the relative speed comprises:
sending a query request to a base station, wherein the query request carries the carrier frequency, the subcarrier spacing and the relative speed, and the query request is configured for the base station to determine the first pilot distribution of pilot symbols in the RB in the frequency domain according to the carrier frequency and the subcarrier spacing and determine the second pilot distribution of pilot symbols in the RB in the time domain according to the carrier frequency, the subcarrier spacing and the relative speed; and
receiving the first pilot distribution and the second pilot distribution returned by the base station.

5. The method of claim 3, wherein, before obtaining the first pilot distribution of pilot symbols in the RB in the frequency domain from the stored first communication protocol according to the carrier frequency and the subcarrier spacing, the method further comprises:
sending an obtaining request to a base station, wherein the obtaining request is configured to obtain the first communication protocol and the second communication protocol; and
receiving the first communication protocol and the second communication protocol returned by the base station.

6. The method of claim 1, wherein determining at least one pilot symbol in the RB according to the carrier frequency and the subcarrier spacing of subcarriers included in the RB and the relative speed between the first device and the second device comprises:

sending a configuration request to a base station, wherein the configuration request carries the carrier frequency, the subcarrier spacing and the relative speed, and the configuration request is configured for the base station to configure at least one pilot symbol in the RB based on the carrier frequency, the subcarrier spacing and the relative speed;

receiving an identifier of the at least one pilot symbol returned by the base station; and determining the at least one pilot symbol in the RB based on the identifier of the at least one pilot symbol.

7. A method for channel estimation, applied to a base station, and comprising:

when a first message is transmitted between a first device and a second device, assigning a resource block (RB) bearing the first message to the first device;

determining distribution information of at least one pilot symbol in the RB according to a carrier frequency and a subcarrier spacing of subcarriers included in the RB and a relative speed between the first device and the second device;

returning the distribution information of at least one pilot symbol to the first device, wherein the distribution information is configured for the first device to determine the at least one pilot symbol in the RB, and estimate a current channel based on the at least one pilot symbol, wherein the distribution information comprises a first pilot distribution and a second pilot distribution, and determining the distribution information of at least one pilot symbol in the RB according to the carrier frequency and the subcarrier spacing of subcarriers included in the RB and the relative speed between the first device and the second device comprises:

receiving a query request sent by the first device, wherein the query request carries the carrier frequency, the subcarrier spacing and the relative speed;

determining the first pilot distribution of pilot symbols in the RB in the frequency domain according to the carrier frequency and the subcarrier spacing; and determining the second pilot distribution of pilot symbols in the RB in the time domain according to the carrier frequency, the subcarrier spacing, and the relative speed.

8. A method for channel estimation, applied to a base station, and comprising:

receiving an obtaining request sent by a first device, wherein the obtaining request is configured to obtain a first communication protocol and a second communication protocol, the first communication protocol is stored with a correspondence relationship between carrier frequencies, subcarrier spacings, and first pilot distributions, and the second communication protocol is stored with a correspondence relationship between carrier frequencies, subcarrier spacings, relative speed ranges, and second pilot distributions; and returning the first communication protocol and the second communication protocol to the first device, such that the first device determines at least one pilot symbol in a resource block (RB) bearing a first message based on the first communication protocol and the second communication protocol, and estimates a current channel based on the at least one pilot symbol, wherein the first message is transmitted between the first device and a second device.

9. The method of claim 8, further comprising:

determining a plurality of sample carrier frequencies, a plurality of sample subcarrier spacings, and a plurality of sample relative speeds;

determining a plurality of sample first pilot distributions according to the plurality of sample carrier frequencies and the plurality of sample subcarrier spacings, and determining a plurality of sample second pilot distributions according to the plurality of sample carrier frequencies and the plurality of sample relative speeds;

generating the first communication protocol based on the plurality of sample carrier frequencies, the plurality of sample subcarrier spacings and the plurality of sample first pilot distributions, and generating the second communication protocol based on the plurality of sample carrier frequencies, the plurality of sample subcarrier spacings, a plurality of relative speed ranges corresponding to the plurality of sample relative speeds, and the plurality of sample second pilot distributions.

10. A device for channel estimation, comprising:
a processor; and
a memory configured to store instructions executable by the processor,
wherein the processor is configured to perform the method of claim 1.

11. A base station, comprising:
a processor; and
a memory configured to store instructions executable by the processor,
wherein the processor is configured to perform the method of claim 7.

12. A base station, comprising:
a processor; and
a memory configured to store instructions executable by the processor,
wherein the processor is configured to perform the method of claim 8.

13. A non-transitory computer readable storage medium, stored thereon with instructions that, when executed by a processor of a device, cause the device to perform the method for channel estimation of claim 1.

14. A non-transitory computer readable storage medium, stored thereon with instructions that, when executed by a processor of a base station, cause the base station to perform the method for channel estimation of claim 7.

15. A non-transitory computer readable storage medium, stored thereon with instructions that, when executed by a processor of a base station, cause the base station to perform the method for channel estimation of claim 8.

* * * * *